US012801576B2

(12) United States Patent
Gopalapura Venkatesh et al.

(10) Patent No.: US 12,801,576 B2
(45) Date of Patent: *Nov. 17, 2026

(54) FILE SERVER MANAGERS AND SYSTEMS FOR MANAGING VIRTUALIZED FILE SERVERS

(71) Applicant: NUTANIX, INC., San Jose, CA (US)

(72) Inventors: Anil Kumar Gopalapura Venkatesh, Pleasanton, CA (US); Kalpesh Ashok Bafna, Fremont, CA (US); Manoj Premanand Naik, San Jose, CA (US); Mausumi Ranasingh, San Jose, CA (US)

(73) Assignee: Nutanix, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/830,486

(22) Filed: Sep. 10, 2024

(65) Prior Publication Data

US 2025/0225105 A1 Jul. 10, 2025

Related U.S. Application Data

(63) Continuation of application No. 17/581,418, filed on Jan. 21, 2022, now Pat. No. 12,117,972.

(Continued)

(51) Int. Cl.

*G06F 16/20* (2019.01)
*G06F 9/455* (2018.01)

(Continued)

(52) U.S. Cl.

CPC ........ *G06F 16/188* (2019.01); *G06F 9/45558* (2013.01); *G06F 16/164* (2019.01);

(Continued)

(58) Field of Classification Search

CPC .. G06F 16/188; G06F 16/164; G06F 16/1824; G06F 16/178; G06F 9/45558; G06F 2009/25595

(Continued)

(56) References Cited

U.S. PATENT DOCUMENTS

| | | | |
|---|---|---|---|
| 5,276,867 | A | 1/1994 | Kenley et al. |
| 5,664,144 | A | 9/1997 | Yanai et al. |

(Continued)

FOREIGN PATENT DOCUMENTS

| | | | |
|---|---|---|---|
| CN | 103746997 | A | 4/2014 |
| CN | 105100210 | A | 11/2015 |

(Continued)

OTHER PUBLICATIONS

US 11,048,595 B2, 06/2021, Venkatesh et al. (withdrawn)

(Continued)

*Primary Examiner* — Daniel A Kuddus
(74) *Attorney, Agent, or Firm* — Stoel Rives LLP

(57) ABSTRACT

An example file server manager disclosed herein receives a registration for a distributed file server, where the distributed file server is hosted in a virtualization environment and includes a cluster of file server virtual machines configured to provide access to a file system. The file server manager further synchronizes metadata with the distributed file server, the metadata including identification of each of the file server virtual machines of the cluster of file server virtual machines, the metadata including information regarding the file system and receiving a management request for the distributed file server. The file server manager further formats the management request for the virtualization environment based on the metadata and utilizing information from the registration to access the distributed file server with the formatted management request.

33 Claims, 12 Drawing Sheets

Related U.S. Application Data

(60) Provisional application No. 63/260,438, filed on Aug. 19, 2021.

(51) Int. Cl.
*G06F 16/16* (2019.01)
*G06F 16/178* (2019.01)
*G06F 16/182* (2019.01)
*G06F 16/188* (2019.01)

(52) U.S. Cl.
CPC ........ *G06F 16/178* (2019.01); *G06F 16/1824* (2019.01); *G06F 2009/45595* (2013.01)

(58) Field of Classification Search
USPC ............................ 707/827, 831, 825, 828 W
See application file for complete search history.

(56) References Cited

U.S. PATENT DOCUMENTS 5,870,555 A 2/1999 Pruett et al.
5,873,085 A 2/1999 Enoki et al.
5,924,096 A 7/1999 Draper et al.
6,044,367 A 3/2000 Wolff
6,055,543 A 4/2000 Christensen et al.
6,085,234 A 7/2000 Pitts et al.
6,101,508 A 8/2000 Wolff
6,212,531 B1 4/2001 Blea et al.
6,289,356 B1 9/2001 Hitz et al.
6,341,340 B1 1/2002 Tsukerman et al.
6,442,602 B1 8/2002 Choudhry
6,539,381 B1 3/2003 Prasad et al.
6,694,447 B1 2/2004 Leach et al.
6,963,914 B1 11/2005 Breitbart et al.
6,968,345 B1 11/2005 Muhlestein
7,120,631 B1 10/2006 Vahalia et al.
7,159,056 B2 1/2007 Goldick
7,162,467 B2 1/2007 Eshleman et al.
7,356,679 B1 4/2008 Le et al.
7,366,738 B2 4/2008 Yorke et al.
7,409,511 B2 8/2008 Edwards et al.
7,606,868 B1 10/2009 Le et al.
7,702,843 B1 4/2010 Chen et al.
7,707,618 B1 4/2010 Cox et al.
7,725,671 B2 5/2010 Prahlad et al.
7,752,492 B1 7/2010 Armangau et al.
7,774,391 B1 8/2010 Le et al.
7,805,469 B1 9/2010 Nagaralu et al.
7,805,511 B1 9/2010 Panicker et al.
7,840,533 B2 11/2010 Prahlad et al.
7,890,529 B1 2/2011 Srinivasan et al.
7,937,453 B1 5/2011 Hayden et al.
8,095,810 B2 1/2012 Matsuzawa et al.
8,095,931 B1 1/2012 Chen et al.
8,112,661 B1 2/2012 La France et al.
8,352,482 B2 1/2013 Hansen
8,352,608 B1 1/2013 Keagy et al.
8,359,594 B1 1/2013 Davidson et al.
8,365,167 B2 1/2013 Beaty et al.
8,407,448 B1 3/2013 Hayden et al.
8,447,728 B2 5/2013 Prahlad et al.
8,473,462 B1 6/2013 Banerjee
8,484,163 B1 7/2013 Yucel et al.
8,484,356 B1 7/2013 Douglis et al.
8,539,076 B2 9/2013 Nakano et al.
8,543,790 B2 9/2013 Chen et al.
8,549,518 B1 10/2013 Aron et al.
8,601,473 B1 12/2013 Aron et al.
8,635,351 B2 1/2014 Astete et al.
8,646,089 B2 2/2014 Jayanthi et al.
8,688,660 B1 4/2014 Sivasubramanian et al.
8,700,573 B2 4/2014 Enko et al.
8,719,522 B1 5/2014 Chait et al.
8,725,679 B2 5/2014 Nair et al.
8,751,515 B1 6/2014 Xing et al.
8,762,335 B2 6/2014 Prahlad et al.
8,805,951 B1 8/2014 Faibish et al.
8,838,923 B2 9/2014 Prahlad et al.
8,850,130 B1 9/2014 Aron et al.
8,863,124 B1 10/2014 Aron
8,909,753 B2 12/2014 Nakamura et al.
8,914,429 B2 12/2014 Pitts
8,935,563 B1 1/2015 Rajaa et al.
8,949,557 B2 2/2015 Kamei et al.
8,966,188 B1 2/2015 Bardale
8,983,952 B1 3/2015 Zhang et al.
8,996,783 B2 3/2015 Huang et al.
9,009,106 B1 4/2015 Aron et al.
9,043,567 B1 5/2015 Modukuri et al.
9,060,014 B2 6/2015 Crowley
9,069,708 B2 6/2015 Gill et al.
9,152,628 B1 10/2015 Stacey et al.
9,154,535 B1 10/2015 Harris
9,165,003 B1 10/2015 Tummala et al.
9,201,698 B2 12/2015 Ashok et al.
9,201,704 B2 12/2015 Chang et al.
9,201,887 B1 12/2015 Earl et al.
9,208,210 B2 12/2015 Erofeev
9,213,513 B2 12/2015 Hartz et al.
9,244,674 B2 1/2016 Waterman et al.
9,244,969 B1 1/2016 Love et al.
9,256,475 B1 * 2/2016 Aron ......................... G06F 3/06
9,256,612 B1 2/2016 Bhatt et al.
9,268,586 B2 2/2016 Voccio et al.
9,274,817 B1 3/2016 Fan et al.
9,286,298 B1 3/2016 Gillett
9,292,327 B1 3/2016 Von Thenen et al.
9,336,132 B1 5/2016 Aron et al.
9,348,702 B2 5/2016 Hsu et al.
9,405,566 B2 8/2016 Chawla et al.
9,411,628 B2 8/2016 Bezbaruah et al.
9,448,887 B1 9/2016 Dayan et al.
9,495,478 B2 11/2016 Hendrickson et al.
9,497,257 B1 11/2016 Love et al.
9,513,946 B2 12/2016 Sevigny et al.
9,519,596 B2 12/2016 Coppola et al.
9,535,907 B1 1/2017 Stringham
9,563,555 B2 2/2017 Flynn et al.
9,571,561 B2 2/2017 Jang
9,619,257 B1 4/2017 Aron et al.
9,634,990 B2 4/2017 Lee
9,639,428 B1 5/2017 Boda et al.
9,652,265 B1 5/2017 Narayanasamy et al.
9,658,899 B2 5/2017 Jenkins
9,690,670 B1 6/2017 Paulzagade et al.
9,733,958 B2 8/2017 Cui et al.
9,740,436 B2 8/2017 Fiebrich-Kandler et al.
9,740,472 B1 8/2017 Sohi et al.
9,740,723 B2 8/2017 Prahlad et al.
9,747,287 B1 8/2017 Bhardwaj et al.
9,772,866 B1 9/2017 Aron et al.
9,832,136 B1 11/2017 Gibson
9,846,706 B1 12/2017 Basov et al.
9,853,978 B2 12/2017 Tellvik et al.
9,870,291 B2 1/2018 Bezbaruah et al.
9,886,215 B1 * 2/2018 Ramachandran ....... G06F 11/14
9,893,988 B2 2/2018 Agarwal et al.
9,940,154 B2 4/2018 Ramani et al.
9,946,573 B2 4/2018 Mcdermott
9,952,782 B1 * 4/2018 Chandrasekaran ... G06F 3/0607
10,009,215 B1 6/2018 Shorey
10,050,862 B2 8/2018 Nambiar et al.
10,083,022 B2 9/2018 Fukui et al.
10,084,873 B2 9/2018 Dornemann
10,095,506 B2 10/2018 Venkatesh et al.
10,101,989 B2 10/2018 Sinha et al.
10,114,706 B1 10/2018 Chougala et al.
10,127,059 B2 11/2018 Astete et al.
10,140,115 B2 11/2018 Fukui et al.
10,152,233 B2 12/2018 Xu et al.
10,210,048 B2 2/2019 Sancheti
10,248,657 B2 4/2019 Prahlad et al.
10,310,953 B2 6/2019 Vijayan et al.
10,311,153 B2 6/2019 Mason, Jr. et al.

(56) References Cited

U.S. PATENT DOCUMENTS 10,367,753 B2 7/2019 Schultze et al.
10,394,547 B2 8/2019 Fukui et al.
10,419,426 B2 9/2019 Bakshan et al.
10,484,894 B2 11/2019 Gonzalez et al.
10,523,592 B2 12/2019 Byers et al.
10,530,742 B2 1/2020 Shah et al.
10,540,164 B2 1/2020 Bafna et al.
10,540,165 B2 1/2020 Bafna et al.
10,540,166 B2 1/2020 Arikatla et al.
10,541,064 B2 * 1/2020 Lee ....................... C04B 35/565
10,594,730 B1 3/2020 Summers et al.
10,719,305 B2 7/2020 Sinha et al.
10,719,306 B2 7/2020 Deshmukh et al.
10,719,307 B2 7/2020 Kanada et al.
10,728,090 B2 7/2020 Deshmukh et al.
10,809,998 B2 10/2020 Venkatesh et al.
10,824,455 B2 11/2020 Arikatla et al.
10,831,465 B2 11/2020 Sharpe et al.
10,838,708 B2 11/2020 Sinha et al.
10,949,192 B2 3/2021 Venkatesh et al.
11,025,626 B1 6/2021 Todd et al.
11,086,826 B2 8/2021 Thummala et al.
11,106,447 B2 8/2021 Gupta et al.
11,281,484 B2 3/2022 Bafna et al.
11,288,239 B2 3/2022 Bafna
11,294,777 B2 4/2022 Venkatesh et al.
11,347,601 B1 5/2022 Nachiappan et al.
12,117,972 B2 10/2024 Gopalapura Venkatesh et al.
12,153,690 B2 11/2024 Thummala et al.
12,164,383 B2 12/2024 Rathi et al.
12,189,499 B2 1/2025 Wang et al.
2001/0047400 A1 11/2001 Coates et al.
2002/0069196 A1 6/2002 Betros et al.
2002/0120763 A1 8/2002 Miloushev et al.
2003/0014442 A1 1/2003 Shiigi et al.
2003/0018784 A1 1/2003 Lette et al.
2003/0115218 A1 6/2003 Bobbitt et al.
2003/0163597 A1 8/2003 Hellman et al.
2003/0195942 A1 10/2003 Muhlestein et al.
2004/0054777 A1 3/2004 Ackaouy et al.
2004/0199734 A1 10/2004 Rajamani et al.
2004/0210591 A1 10/2004 Hirschfeld et al.
2004/0225742 A1 11/2004 Loaiza et al.
2004/0267832 A1 12/2004 Wong et al.
2005/0120160 A1 6/2005 Plouffe et al.
2005/0120180 A1 6/2005 Schornbach et al.
2005/0125503 A1 6/2005 Iyengar et al.
2005/0193221 A1 9/2005 Yoneyama
2005/0193245 A1 9/2005 Hayden et al.
2005/0226059 A1 10/2005 Kavuri et al.
2005/0228798 A1 10/2005 Shepard et al.
2006/0010227 A1 1/2006 Atluri
2006/0047685 A1 3/2006 Dearing et al.
2006/0080445 A1 4/2006 Chang et al.
2006/0167921 A1 7/2006 Grebus et al.
2006/0206901 A1 9/2006 Chan
2006/0224918 A1 10/2006 Koike
2006/0225065 A1 10/2006 Chandhok et al.
2006/0271510 A1 11/2006 Harward et al.
2006/0271931 A1 11/2006 Harris et al.
2007/0022129 A1 1/2007 Bahar et al.
2007/0038913 A1 2/2007 Allen et al.
2007/0100905 A1 5/2007 Masters et al.
2007/0101437 A1 5/2007 Yamamoto et al.
2007/0171921 A1 7/2007 Wookey et al.
2007/0179991 A1 8/2007 Burnett et al.
2007/0179995 A1 8/2007 Prahlad et al.
2007/0300220 A1 12/2007 Seliger et al.
2008/0040483 A1 2/2008 Nakatani et al.
2008/0071997 A1 3/2008 Loaiza et al.
2008/0098194 A1 4/2008 Hashimoto et al.
2008/0104349 A1 5/2008 Maruyama et al.
2008/0104589 A1 5/2008 Mccrory et al.
2008/0114854 A1 5/2008 Wong et al.
2008/0133486 A1 6/2008 Fitzgerald et al.
2008/0134178 A1 6/2008 Fitzgerald et al.
2008/0189468 A1 8/2008 Schmidt et al.
2008/0201414 A1 8/2008 Amir et al.
2008/0201457 A1 8/2008 London
2008/0229142 A1 9/2008 Anand et al.
2008/0263113 A1 10/2008 Krishnaiyer et al.
2008/0270677 A1 10/2008 Kolakowski
2008/0320499 A1 12/2008 Suit
2008/0320583 A1 12/2008 Sharma et al.
2009/0006801 A1 1/2009 Shultz et al.
2009/0100248 A1 4/2009 Kami
2009/0150885 A1 6/2009 Safari et al.
2009/0158082 A1 6/2009 Jain et al.
2009/0171971 A1 7/2009 Goddard et al.
2009/0193272 A1 7/2009 Matsuzawa et al.
2009/0216975 A1 8/2009 Halperin et al.
2009/0248870 A1 10/2009 Kamei et al.
2009/0249470 A1 10/2009 Litvin et al.
2009/0254572 A1 10/2009 Redlich et al.
2009/0271412 A1 10/2009 Lacapra et al.
2009/0287887 A1 11/2009 Matsuki et al.
2009/0288084 A1 11/2009 Astete et al.
2010/0023521 A1 1/2010 Arcese et al.
2010/0070725 A1 3/2010 Prahlad et al.
2010/0082716 A1 4/2010 Agetsuma et al.
2010/0082774 A1 4/2010 Pitts
2010/0095289 A1 4/2010 Nguyen et al.
2010/0138921 A1 6/2010 Na et al.
2010/0174745 A1 7/2010 Ryan et al.
2010/0214908 A1 8/2010 Ralev
2010/0241785 A1 9/2010 Chen et al.
2010/0250824 A1 9/2010 Belay
2010/0275205 A1 10/2010 Nakajima
2011/0022694 A1 1/2011 Dalal et al.
2011/0022695 A1 1/2011 Dalal et al.
2011/0022812 A1 1/2011 Van et al.
2011/0022883 A1 1/2011 Hansen
2011/0047340 A1 2/2011 Olson et al.
2011/0078318 A1 3/2011 Desai et al.
2011/0119668 A1 5/2011 Calder et al.
2011/0119763 A1 5/2011 Wade et al.
2011/0125835 A1 5/2011 Soltis
2011/0137879 A1 6/2011 Dubey et al.
2011/0161299 A1 6/2011 Prahlad et al.
2011/0179414 A1 7/2011 Goggin et al.
2011/0184993 A1 7/2011 Chawla et al.
2011/0185292 A1 7/2011 Chawla et al.
2011/0225574 A1 9/2011 Khalidi et al.
2011/0239213 A1 9/2011 Aswani et al.
2011/0251992 A1 10/2011 Bethlehem et al.
2011/0252208 A1 10/2011 Ali et al.
2011/0255538 A1 10/2011 Srinivasan et al.
2011/0265076 A1 10/2011 Thorat et al.
2011/0271279 A1 11/2011 Pate
2011/0276578 A1 11/2011 Allalouf et al.
2011/0276963 A1 11/2011 Wu et al.
2011/0283277 A1 11/2011 Castillo et al.
2011/0289561 A1 11/2011 Ivanov et al.
2011/0307729 A1 12/2011 Matsuzawa et al.
2011/0320690 A1 12/2011 Petersen et al.
2012/0017114 A1 1/2012 Timashev et al.
2012/0023495 A1 1/2012 Machida
2012/0030456 A1 2/2012 Wu et al.
2012/0054736 A1 3/2012 Arcese et al.
2012/0081395 A1 4/2012 Adi et al.
2012/0084381 A1 4/2012 Alladi et al.
2012/0166866 A1 6/2012 Rao et al.
2012/0209983 A1 8/2012 Bronner et al.
2012/0233463 A1 9/2012 Holt et al.
2012/0254445 A1 10/2012 Kawamoto et al.
2012/0254567 A1 10/2012 Umbehocker
2012/0266162 A1 10/2012 Baron
2012/0272237 A1 10/2012 Baron
2012/0290630 A1 11/2012 Aizman et al.
2012/0304247 A1 11/2012 Badger et al.
2012/0310881 A1 12/2012 Shadmon
2012/0310892 A1 12/2012 Dam et al.
2012/0324183 A1 12/2012 Chiruvolu et al.
2013/0046740 A1 2/2013 Li et al.

(56) References Cited

U.S. PATENT DOCUMENTS

2013/0047160 A1 2/2013 Conover
2013/0055018 A1 2/2013 Joshi et al.
2013/0061110 A1 3/2013 Zvibel
2013/0061167 A1 3/2013 Rhodes et al.
2013/0066930 A1 3/2013 Kamei et al.
2013/0117744 A1 5/2013 Klein et al.
2013/0132674 A1 5/2013 Sundrani
2013/0144921 A1 6/2013 Nakamura et al.
2013/0151888 A1 6/2013 Bhattiprolu et al.
2013/0152085 A1 6/2013 D'Amore et al.
2013/0185716 A1 7/2013 Yin et al.
2013/0198738 A1 8/2013 Reddin et al.
2013/0212345 A1 8/2013 Nakajima
2013/0227379 A1 8/2013 Gupta et al.
2013/0227552 A1 8/2013 Reddin et al.
2013/0227566 A1 8/2013 Higuchi et al.
2013/0232491 A1 9/2013 Radhakrishnan et al.
2013/0246705 A1 9/2013 Diare
2013/0247036 A1 9/2013 Fujiwara
2013/0262396 A1 10/2013 Kripalani et al.
2013/0283267 A1 10/2013 Cooper et al.
2013/0297869 A1 11/2013 Mills et al.
2013/0318229 A1 11/2013 Bakre et al.
2014/0006708 A1 1/2014 Huynh et al.
2014/0013398 A1 1/2014 Hotti
2014/0025796 A1 1/2014 Vibhor et al.
2014/0059392 A1 2/2014 Ren et al.
2014/0095544 A1 4/2014 Eshel et al.
2014/0095555 A1 4/2014 Kim et al.
2014/0095816 A1 4/2014 Hsu et al.
2014/0108587 A1 4/2014 Goldberg et al.
2014/0115182 A1 4/2014 Sabaa et al.
2014/0122547 A1 5/2014 Agetsuma et al.
2014/0123138 A1 5/2014 Lee et al.
2014/0146055 A1 5/2014 Bala et al.
2014/0149794 A1 5/2014 Shetty et al.
2014/0149983 A1 5/2014 Bonilla et al.
2014/0173199 A1 6/2014 Gupta et al.
2014/0181116 A1 6/2014 Wang
2014/0188808 A1 7/2014 Wolf et al.
2014/0189429 A1 7/2014 Gill et al.
2014/0189677 A1 7/2014 Curzi et al.
2014/0189685 A1 7/2014 Kripalani
2014/0189686 A1 7/2014 Masters et al.
2014/0196038 A1 7/2014 Kottomtharayi et al.
2014/0201725 A1 7/2014 Tian et al.
2014/0207824 A1 7/2014 Brandwine et al.
2014/0230024 A1 8/2014 Uehara et al.
2014/0237464 A1 8/2014 Waterman et al.
2014/0250300 A1 9/2014 Runkis et al.
2014/0279909 A1 9/2014 Sudarsanam et al.
2014/0298185 A1 10/2014 Chen et al.
2014/0310710 A1 10/2014 Lubsey et al.
2014/0359612 A1 12/2014 D'Amato et al.
2014/0365811 A1 12/2014 Veiga et al.
2015/0006707 A1 1/2015 Malik et al.
2015/0006788 A1 1/2015 Liu et al.
2015/0007180 A1 1/2015 Sharp et al.
2015/0026682 A1 1/2015 Singh et al.
2015/0032690 A1 1/2015 Hoque et al.
2015/0039735 A1 2/2015 Zeyliger et al.
2015/0039837 A1 2/2015 Quan et al.
2015/0081644 A1 3/2015 Pitts
2015/0095788 A1 4/2015 Thiele et al.
2015/0096011 A1* 4/2015 Watt .................... G06F 3/0647
726/15
2015/0106802 A1 4/2015 Ivanov et al.
2015/0142745 A1 5/2015 Tekade et al.
2015/0142747 A1 5/2015 Zou
2015/0143164 A1 5/2015 Veerla et al.
2015/0172412 A1 6/2015 Escriva et al.
2015/0178019 A1 6/2015 Hegdal et al.
2015/0205639 A1 7/2015 Matsumoto et al.
2015/0213032 A1 7/2015 Powell et al.
2015/0215389 A1 7/2015 Spencer
2015/0220324 A1 8/2015 Arcese et al.
2015/0242291 A1 8/2015 Chang et al.
2015/0278046 A1 10/2015 Zellermayer et al.
2015/0293830 A1 10/2015 Bhide et al.
2015/0293896 A1 10/2015 Runkis et al.
2015/0301903 A1 10/2015 Mutha et al.
2015/0309891 A1 10/2015 Saika
2015/0324217 A1 11/2015 Shilmover et al.
2015/0326531 A1 11/2015 Cui et al.
2015/0331757 A1 11/2015 Durge et al.
2015/0355862 A1 12/2015 Hayes et al.
2015/0378761 A1 12/2015 Sevigny et al.
2015/0378853 A1 12/2015 Sevigny et al.
2016/0004693 A1 1/2016 Chen et al.
2016/0011898 A1 1/2016 Lee et al.
2016/0070492 A1 3/2016 Cherubini et al.
2016/0077988 A1 3/2016 Tipton et al.
2016/0078068 A1 3/2016 Agrawal et al.
2016/0085480 A1 3/2016 Chiu et al.
2016/0085574 A1 3/2016 Dornemann et al.
2016/0087861 A1 3/2016 Kuan et al.
2016/0110214 A1 4/2016 Vincent et al.
2016/0110267 A1 4/2016 Earl et al.
2016/0124665 A1 5/2016 Jain et al.
2016/0162371 A1 6/2016 Prabhu et al.
2016/0171241 A1 6/2016 Yun
2016/0179416 A1 6/2016 Mutha et al.
2016/0179419 A1 6/2016 Yamaguchi et al.
2016/0188232 A1 6/2016 Ramachandran et al.
2016/0188407 A1 6/2016 Bronnikov et al.
2016/0202916 A1 7/2016 Cui et al.
2016/0203008 A1 7/2016 Cui et al.
2016/0216993 A1 7/2016 Beckwith et al.
2016/0224363 A1 8/2016 Joy
2016/0274926 A1 9/2016 Narasimhamurthy et al.
2016/0301766 A1 10/2016 Ionescu et al.
2016/0316003 A1 10/2016 Snider et al.
2016/0328226 A1 11/2016 Arya et al.
2016/0335108 A1 11/2016 Ryu et al.
2016/0335134 A1 11/2016 Gupta et al.
2016/0359697 A1 12/2016 Scheib et al.
2016/0378528 A1 12/2016 Zamir
2016/0378616 A1 12/2016 Wigmore et al.
2017/0004131 A1 1/2017 Ben Dayan et al.
2017/0005990 A1 1/2017 Birger et al.
2017/0012904 A1 1/2017 Matzek et al.
2017/0024152 A1 1/2017 Bhagi et al.
2017/0024224 A1 1/2017 Bakke et al.
2017/0039078 A1 2/2017 Chen et al.
2017/0039218 A1 2/2017 Prahlad et al.
2017/0048223 A1 2/2017 Anantha Padmanaban et al.
2017/0068469 A1 3/2017 Shankar et al.
2017/0075921 A1 3/2017 Benton et al.
2017/0090776 A1 3/2017 Kowles
2017/0091047 A1 3/2017 Bangalore et al.
2017/0109184 A1 4/2017 Ramani et al.
2017/0149886 A1 5/2017 Shetty
2017/0160983 A1 6/2017 Fiske et al.
2017/0177638 A1 6/2017 Bhosale et al.
2017/0193021 A1 7/2017 Deng et al.
2017/0206074 A1 7/2017 Arcese et al.
2017/0206207 A1* 7/2017 Bondurant ............ G06F 16/183
2017/0220661 A1 8/2017 Cao et al.
2017/0228300 A1 8/2017 Thomas et al.
2017/0235507 A1 8/2017 Sinha et al.
2017/0235562 A1 8/2017 Bafna et al.
2017/0235563 A1 8/2017 Bafna et al.
2017/0235589 A1* 8/2017 Gopalapura Venkatesh ................
G06F 11/0712
718/1
2017/0235590 A1 8/2017 Sinha et al.
2017/0235591 A1 8/2017 Kanada et al.
2017/0235653 A1 8/2017 Arikatla et al.
2017/0235654 A1 8/2017 Deshmukh et al.
2017/0235751 A1 8/2017 Gupta et al.
2017/0235758 A1 8/2017 Gopalapura Venkatesh et al.
2017/0235760 A1* 8/2017 Sharpe ................ G06F 11/0712
707/827
2017/0235761 A1 8/2017 Bafna et al.

(56) References Cited

U.S. PATENT DOCUMENTS

2017/0235762 A1 8/2017 Sharpe et al.
2017/0235763 A1 8/2017 Gopalapura Ventatesh et al.
2017/0235764 A1* 8/2017 Sharpe ................ G06F 11/0712 707/827
2017/0235950 A1 8/2017 Gopalapura Venkatesh et al.
2017/0242599 A1 8/2017 Patnaik et al.
2017/0262346 A1 9/2017 Pradhan et al.
2017/0262347 A1* 9/2017 Dornemann ........ G06F 11/3055
2017/0264684 A1 9/2017 Spillane et al.
2017/0277556 A1 9/2017 Ishii et al.
2017/0277903 A1 9/2017 Christodorescu et al.
2017/0279674 A1 9/2017 Zhu
2017/0286228 A1 10/2017 Redko et al.
2017/0302589 A1 10/2017 Leafe et al.
2017/0302731 A1 10/2017 Cui
2018/0004766 A1 1/2018 Darling
2018/0011766 A1 1/2018 Lee et al.
2018/0062993 A1 3/2018 Wu et al.
2018/0113623 A1 4/2018 Sancheti
2018/0129426 A1 5/2018 Aron et al.
2018/0143845 A1 5/2018 Chawla et al.
2018/0143880 A1 5/2018 Dornemann
2018/0145960 A1 5/2018 Bakshan et al.
2018/0157521 A1 6/2018 Arikatla et al.
2018/0157522 A1* 6/2018 Bafna ................... G06F 16/182
2018/0157561 A1 6/2018 Venkatesh et al.
2018/0157677 A1 6/2018 Bafna et al.
2018/0157752 A1* 6/2018 Arikatla .................. G06F 16/14
2018/0157860 A1* 6/2018 Nair .................... G06F 21/6218
2018/0159729 A1 6/2018 Deshmukh et al.
2018/0159826 A1 6/2018 Yisan et al.
2018/0173731 A1 6/2018 Nazari et al.
2018/0196719 A1 7/2018 Glass
2018/0205787 A1 7/2018 Ben Dayan et al.
2018/0278602 A1 9/2018 Koushik et al.
2018/0332105 A1 11/2018 Huang et al.
2018/0357251 A1 12/2018 Kumarasamy et al.
2019/0026101 A1 1/2019 Venkatesh et al.
2019/0034240 A1 1/2019 Nabi et al.
2019/0079747 A1* 3/2019 Sinha ................. G06F 11/0712
2019/0129807 A1 5/2019 Zhang
2019/0129808 A1 5/2019 Acharya et al.
2019/0179918 A1 6/2019 Singh et al.
2019/0196718 A1 6/2019 Pai et al.
2019/0207925 A1 7/2019 Anantha Padmanaban et al.
2019/0228147 A1 7/2019 Formato et al.
2019/0243703 A1 8/2019 Rooney et al.
2019/0332683 A1 10/2019 Thummala et al.
2019/0339883 A1 11/2019 Aron et al.
2020/0004424 A1 1/2020 Khan et al.
2020/0004641 A1 1/2020 Singhal et al.
2020/0007530 A1 1/2020 Mohamad Abdul et al.
2020/0034069 A1 1/2020 Batra et al.
2020/0036647 A1 1/2020 Gupta et al.
2020/0081704 A1 3/2020 Bafna et al.
2020/0081733 A1 3/2020 Buck et al.
2020/0106669 A1 4/2020 Dhillon et al.
2020/0125580 A1 4/2020 Shao
2020/0137157 A1 4/2020 Joseph et al.
2020/0162551 A1* 5/2020 Vijayan ................. G06F 21/604
2020/0193059 A1 6/2020 Narayanswamy et al.
2020/0274869 A1 8/2020 Tahenakos et al.
2021/0004454 A1 1/2021 Chester et al.
2021/0049074 A1 2/2021 Bezerra Maimoni et al.
2021/0049079 A1 2/2021 Kumar et al.
2021/0141630 A1 5/2021 Sharpe et al.
2021/0157690 A1 5/2021 Wexler et al.
2021/0200641 A1 7/2021 Bafna et al.
2021/0224233 A1 7/2021 Bafna et al.
2021/0247973 A1 8/2021 Gupta et al.
2021/0318132 A1 10/2021 Simpson
2021/0318938 A1 10/2021 Benke et al.
2021/0326358 A1 10/2021 Seelemann, II et al.
2021/0334178 A1 10/2021 Yang et al.
2021/0342237 A1 11/2021 Polimera et al.
2021/0344772 A1 11/2021 Arikatla et al.
2021/0349859 A1 11/2021 Bafna et al.
2021/0365257 A1 11/2021 Venkatesh et al.
2021/0373815 A1 12/2021 Kumar et al.
2021/0390080 A1 12/2021 Tripathi et al.
2021/0397587 A1 12/2021 Thummala et al.
2021/0406136 A1 12/2021 Venkatesh et al.
2022/0004377 A1 1/2022 Sharpe et al.
2022/0012208 A1 1/2022 Singhal et al.
2022/0091947 A1 3/2022 Kothari et al.
2022/0147342 A1 5/2022 Sharpe et al.
2022/0147495 A1 5/2022 Sharpe et al.
2022/0156107 A1 5/2022 Bafna et al.
2022/0283708 A1 9/2022 Grunwald et al.
2022/0292002 A1 9/2022 Kumar et al.
2023/0056217 A1 2/2023 Rathi et al.
2023/0056425 A1 2/2023 Gopalapura Venkatesh et al.
2023/0066137 A1 3/2023 Vijapurapu et al.
2023/0068262 A1 3/2023 Bafna et al.
2023/0082186 A1 3/2023 Balcha et al.
2023/0101337 A1 3/2023 Ahmad et al.
2023/0237022 A1 7/2023 Thomas et al.
2023/0237170 A1 7/2023 Thummala et al.
2023/0267053 A1 8/2023 Khanna et al.
2024/0045774 A1 2/2024 Wang et al.
2024/0070032 A1 2/2024 Wang et al.
2025/0103738 A1 3/2025 Verma et al.
2025/0265156 A1 8/2025 Rathi et al.

FOREIGN PATENT DOCUMENTS

CN 110516005 A 11/2019
CN 110519112 A 11/2019
CN 110569269 A 12/2019
EP 1062581 B1 10/2003
EP 1214663 B1 6/2006
EP 1979814 A2 10/2008
WO 2010050944 A1 5/2010
WO 2012126177 A2 9/2012
WO 2016018446 A1 2/2016
WO 2018014650 A1 1/2018

OTHER PUBLICATIONS

Jung et al., Standard-based Virtual Infrastructure Resource Management for Distributed and Heterogenous Servers; Feb. 2009.*

Isilon OneFS, Version 8.0.1; Web Administration Guide, Oct. 2016.

Dell EMC; Dell EMC Isilon OneFS Operating System; Scale-out NAS to maximize the data capital and business value of your unstructured data, 2020, pp. all.

Dell EMC; White Paper; Dell EMC Isilon ONEFS Operating System; Powering the Isilon Scale-Out Storage Platform, Dec. 2019, pp. all.

"Administering VMware vSAN—VMware vSphere 7.0", Update 1; docs.vmware.com/en/VMware-vSphere/7.0/vsan-701-administration-guide.pdf, 2015-2020, pp. 1-114.

"Architecture for Continuous Replication", Commvault, May 7, 2020, pp. 1-4.

"Backup vSAN 7 File Share with Veeam Backup & Replication 10", Sysadmin Stories, https://www.sysadminstories.com/2020/06/backup-vsan-7-file-share-with-veeam.html, Jun. 2, 2020, pp. 1-7.

"Carbonite Availability for Windows User's Guide Version 8.1.0", Carbonite, Inc. (United States), Feb. 27, 2018, pp. 1-391.

"Characteristics of a vSAN Cluster", VMWare Docs; retrieved from: https://docs.vmware.com/en/VMware-vSphere/7.0/com.vmware.vsphere.vsan-planning.doc/GUID-C0818534-7B96-43E4-93BB-7955449852DE.html, May 31, 2019, pp. 1-2.

"Clustered Data Ontap 8.2 File Access Management Guide for CIFS", NetApp; (year 2014), Feb. 2014, pp. all.

"Common Tasks—Remote Replication", Arcserve https://support.storagecraft/com/s/article/common-tasks-remote-replication-ox?language=en_US, Oct. 20, 2021, pp. 1-11.

"Designing and Sizing Virtual SAN Fault Domains", Administering VMware Virtual SAN; VMware vSphere 6.5; vSAN 6.6; https://

(56) References Cited

OTHER PUBLICATIONS docs.vmware.com/en/VMware-vSphere/6.5/virtual-san-66-administration-guide.pdf, captured Aug. 20, 2021, 2017, pp. 34.
"DFS Namespaces and DFS Replication Overview", Microsoft Learn, Aug. 31, 2016, pp. 9.
"Disaster Recovery of Workloads on AWS: Recovery in the Cloud", AWS, Feb. 12, 2021, pp. 1-33.
"EMC Isilon OneFS Operating System; Powering scale-out storage for the new world of Big Data in the enterprise", www.EMC.com, Feb. 2020, pp. all.
"Enabling or disabling SMB automatic node referrals", NetApp https://docs.netapp.com/ontap-9/index.jsp?topic=%2Fcom.netapp.doc.cdot-famg-cifs%2FGUID-AC7E8515-3A4C-4BB5-A8C8-38B565C952E0.html, Sep. 19, 2019, pp. all.
"End User Access", Commvault, 2019, pp. 1-4.
"General Share Properties", Oracle ZFS Storage Application Administration Guide, 2013, pp. 1-5.
"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html, Sep. 19, 2019, pp. all.
"High Availability and Data Protection With Dell EMC Isilon Scale-Out NAS", Dell: Dell Inc., Jul. 2018, pp. all.
"How to troubleshoot the 'Autolocation' feature in Clustered Data ONTAP", NetApp https://kb.netapp.com/app/answers/answer_view/a_id/1030857/loc/en_US#_highlight, Sep. 19, 2019, pp. all.
"How to Troubleshoot the 'Autolocation' feature in Clustered Data ONTAP—Results", NetApp https://kb.netapp.com/app/results/kw/autolocation/, Sep. 19, 2019, pp. all.
"Hybrid Cloud Storage with Cloudian HyperStore and Amazon S3", Cloudian Inc.; www.cloudian.com, 2014, pp. all.
"IBM Storwize V7000 Unified", https://www.ibm.com/docs/en/flashsystem-v7000u/1.6.2?topic=maim-best-practices-authentication-id-mapping-configurations-while-using-asynchronous-replication-remote-caching, Mar. 31, 2021, pp. 1-3.
"ID mapping basic concepts", https://www.ibm.com/docs/en/flashsystem-v7000u/1.6.2?topic=mapping-id-basic-concepts, Feb. 27, 2021, pp. 1-8.
"Improving client response time by providing SMB automatic node referrals with Auto Location", NetApp https://library.netapp.com/ecmdocs/ECMP1196891/html/GUID-0A5772A4-A6D7-4A00-AC2A-92B868C5B3B5.html, Sep. 19, 2019, pp. all.
"Introducing HPE Cloud Volumes Backup Chalk Talk", HPE Technology, 2020, pp. 1-5.
"Introduction to Oracle Data Guard", Oracle https://docs.oracle.com/en/database/oracle/oracle-database/19/sbydb/introduction-to-oracle-data-guard-concepts.html#GUID-5E73667D-4A56-445E-911 F-1 E99092DD8D7, Dec. 20, 2021, pp. 1-20.
"Managing Workloads", NetApp https://docs.netapp.com/ontap-9/index.jsp?topic=%2Fcom.netapp.doc.pow-perf-mon%2FGUID-13D35FC5-AF37-4BBD-8A8E-B10B41451A16.html, Sep. 19, 2019, pp. all.
"Neverfail User Guide", Neverfail HybriStor v2.3 | https://neverfail.com/, 2017, pp. 1-58.
"Nutanix AFS—Introduction & Steps For Setting Up", Retrieved from https ://virtual building blocks. com/2 0 1 8/01 /03/nutanix-afs-introduction-steps-for-setting-up/ (Year: 2018), Jan. 3, 2018, 1-23.
"Nutanix Files Guide", Nutanix Files 3.7, Nov. 23, 2021, pp. 1-174.
"Nutanix Files Guide", Nutanix, Sep. 14, 2018, pp. all.
"Nutanix-Files", Nutanix, Inc. v7.0 https://download.nutanix.com/solutionsDocs/TN-2041-Nutanix-Files.pdf, Oct. 2021, pp. 1-89.
"Oracle ZFS Storage Appliance: How To Optimize Replication Performance", Oracle System Handbook—ISO 7.0, Aug. 1, 2018, pp. 1-3.
"Path Failover and Virtual Machines", vSphere Storage; Update 2; VMware vSphere 7.0; VMware ESXi 7.0; vCenter Server 7.0; https://docs.vmware.com/en/VMware-vSphere/7.0/vsphere-esxi-vcenter-server-702-storage-guide.pdf, Jun. 25, 2021, pp. 238.
"Preparing Storage Systems for Snapmirror Replication", NetApp ; NetApp, Apr. 2005, pp. all.
"Protect Your Data With Netapp Element Software", Solution Brief; NetApp, 2018, pp. all.
"Quantum User Essentials", Quantum, 2013, pp. 1-2.
"Replication for File Systems", Commvault, Jan. 4, 2022, pp. 1.
"Replication: Remote Replication Introduction", Oracle Sun ZFS Storage 7000 System Administration Guide, Dec. 2012, pp. 1-6.
"Reversing the Direction of Replication", Oracle ZFS Storage Appliance Administration Guide, 2014, pp. 1-2.
"Server-to-Server Storage Replication with Storage Replica", Microsoft https://docs.microsoft.com/en-us/windows-server/storage/storage-replica/server-to-server-storage-replication,, Jul. 29, 2021, pp. 1-20.
"Setting up and Using Acropolis File Services (AFS) On Nutanix AOS 5.0", Virtual Dennis—Sharing Technical Tips Learned the Hard Way, Dec. 30, 2016, pp. all.
"Storage Replica Overview", Microsoft thttps://docs.microsoft.com/en-us/windows-server/storage/storage-replica/storage-replica-overview, Jul. 29, 2021, pp. 1-11.
"Tech TopX: AHV One Click Upgrade", Screen captures from YouTube video clip, 13 pages, uploaded on Dec. 8, 2015 by user "Nutanix University". Retrieved from Internet: https://www.youtube.com/watch?v=3dALdzw6qZM, Dec. 8, 2015, pp. all.
"Technical Overview and Best Practices", VMware vSphere VMFS ; a VMware Technical White Paper updated for VMware vSphere 5.1, Version 3.0, Nov. 27, 2012, pp. all.
"Understanding Multipathing and Failover", vSphere Storage; VMware vSphere 7.0; VMware ESXi 7.0; vCenter Server 7.0 https://docs.vmware.com/en/VMware-vSphere/7.0/vsphere-esxi-vcenter-server-702-storage-guide.pdf, Jun. 25, 2021, pp. 234-268.
"Virtual Disk Manager User's Guide: Virtual Disk Development Kit", vmware.com; https://www.vmware.com/pdf/VirtualDiskManager.pdf, 2008, 1-12.
"VMware vCenter Server: Centrally Mananged Virtual Infrastructure Delivered with Confidence", VMWare Datasheet; https://www.vmware.com/content/dam/digitalmarketing/vmware/en/pdf/products/vCenter/vmware-vcenter-server-datasheet.pdf, captured Aug. 20, 2021, 2015, 2015, pp. 1-2.
"VMware VSAN 7.0 Release Notes", VMware; https://docs.vmware.com/en/VMware-vSphere/7.0/rn/vmware-vsan-70-release-notes.html, Mar. 8, 2021, pp. 1-12.
"vSAN 7.0 U2 Proof of Concept Guide", VMwareStorage; https://images.core.vmware.com/sites/default/files/resource/vsan_70_u2_proof_of_concept_guide_noindex.pdf, Apr. 2021, pp. 1-267.
"vSAN File Services Tech Note | VMware", Aug. 2021, 1-7.
"vSAN Health Service—File Service—File Server Health (77165)", VMware, Knowledge Base; https://kb.vmware.com/s/article/77165, May 15, 2021, pp. 1-5.
"vSAN Monitoring and Troubleshooting—VMware vSphere 7.0", https://docs.vmware.com/, Sep. 2018, 1-61.
"vSAN Performance Graphs in the vSphere Web Client (2144493)", Nov. 9, 2020, 1-42.
"vSan Planning and Deployment", Update 2 VMWare vSphere 6.7; VMware vSAN 6.7; https://docs.vmware.com/en/VMware-vSphere/6.7/vsan-673-planning-deployment-guide.pdf, Aug. 20, 2019, pp. 1-85.
"vSan Stretched Cluster Guide", VMwareStorage; https://images.core.vmware.com/sites/default/files/resource/vsan_stretched_cluster_guide_noindex.pdf, printed Jun. 24, 2021, Jun. 2020, pp. 1-62.
"vSphere Availability—VMware vSphere 6.7", https://docs.vmware.com/, Jan. 11, 2019, 1-105.
"vSphere Storage—VMware vSphere 6.7", https://docs.vmware.com/, Jan. 4, 2021, 1-382.
Bhardwaj, Rishi , "The Wonderful World of Distributed Systems and the Art of Metadata Management", Nutanix, Inc., https://www.nutanix.com/blog/the-wonderful-world-of-distributed-systems-and-metadata-management; captured Aug. 19, 2021, Sep. 24, 2015, pp. 1-8.
Birk, Ryan , "How it Works: Understanding vSAN Architecture Components", altaro.com, Feb. 28, 2018, 1-10.
Bounds, Jay , "High-Availability (HA) Pair Controller Configuration Overview and Best Practices", NetApp, Feb. 2016, pp. all.

(56) References Cited

OTHER PUBLICATIONS

Cano, Ignacio et al., "Curator: Self-Managing Storage for Enterprise Clusters", University of Washington, Mar. 2017, pp. all.
Cormac, , "Native File Services for vSAN 7", CormacHogan.com; https://cormachogan.com/2020/03/11/native-file-services-for-vsan-7/, Mar. 11, 2020, 1-23.
Costa, Jorge , "High Availability Setup Using Veritas Cluster Server and NetApp Synchronous SnapMirror—One button Failover/Failback with SnapMirror Sync and Veritas Cluster Server", NetApp Community, Nov. 18, 2010, pp. all.
Feroce, Danilo , "Leveraging VMware vSAN for Highly Available Management Clusters", VMware, Inc., Version 2.9, VMware, Inc.; https://www.vmware.com/content/dam/digitalmarketing/vmware/en/pdf/vcat/vmware-leveraging-virtual-san-for-ha-management-clusters.pdf, Jan. 2018, 1-22.
Fojta, Tomas , "Quotas and Quota Policies in VMware Cloud Director", Tom Fojta's Blog; retrieved from: https://fojta.wordpress.com/2020/11/06/quotas-and-quota-policies-in-vmware-cloud-director/, Nov. 6, 2020, 1-4.
Fojta, Tomas , "vSAN File Services with vCloud Director—Tom Fojta's Blog", (wordpress.com) ("Fojta Blog"), Feb. 11, 2021, pp. 1-8.
Hogan, Cormac , "New updates from Nutanix—NOS 3.0 and NX-3000", https://cormachogan.com/2012/12/20/new-from-nutanix-nos-3-0-nx-3000/, Dec. 20, 2012, pp. 1-7.
Jeffrey, Hemmes et al., "Cacheable Decentralized Groups for Grid Resource Access Control", 2006 7th IEEE/ACM International Conference on Grid Computing Department of Computer Science and Engineering, University of Notre Dame, doi: 10.1109/ICGRID.2006.311015, Sep. 2006, pp. 192-199.
Jung, Young-Woo et al., "Standard-Based Vitrual Infrastructure Resource Management for Distributed and Heterogeneous Servers", ICACT, Feb. 15, 2009, pp. all.
Kaam, Bas V. , "New in AOS 5.0: Nutanix Acropolis File Services", basvankaam.com, Jan. 5, 2017, pp. all.
Kemp, Erik , "NetApp SolidFire SnapMirror Architecture and Configuration", Technical Report, NetApp, Dec. 2017, pp. all.
Kleyman, Bill , "How Cloud Computing Changes Storage Tiering", https://www.datacenterknowledge.com ; captured Jun. 4, 2019, Nov. 12, 2015, pp. all.
Leibovici, Andre , "Nutanix One-Click Upgrade now takes care of Firmware and Hypervisor too!", myvirtualcloud.net https://myvirtualcloud.net/nutanix-one-click-upgrade-now-takes-care-of-firmware-and-hypervisor-too/, Jul. 31, 2014, pp. 1-4.
Poitras, Steven , "The Nutanix Bible", https://nutanixbible.com/, Apr. 9, 2019, pp. all.
Poitras, Steven , "The Nutanix Bible", http://stevenpoitras.com/the-nutanix-bible/ (Publication date based on indicated capture date by Archive.org; first publication date unknown), Jan. 11, 2014, pp. all.
Poitras, Steven , "The Nutanix Bible", https://nutanixbible.com/, Jan. 12, 2016, pp. all.
Poitras, Steven , "The Nutanix Bible", https://nutanixbible.com/, Jan. 3, 2017, pp. all.
Poitras, Steven , "The Nutanix Bible", https://nutanixbible.com/, Jan. 3, 2018, pp. all.
Poitras, Steven , "The Nutanix Bible", http://stevenpoitras.com/the-nutanix-bible/ (Publication date based on indicated capture date by Archive.org; first publication date unknown), Jan. 7, 2015, pp. all.
Poitras, Steven , "The Nutanix Bible", https://nutanixbible.com/, Jan. 8, 2019, pp. all.
Poitras, Steven , "The Nutanix Bible", https://nutanixbible.com/, Jul. 25, 2019, pp. all.
Poitras, Steven , "The Nutanix Bible", http://stevenpoitras.com/the-nutanix-bible/ (Publication date based on indicated capture date by Archive.org; first publication date unknown), Jun. 20, 2014, pp. all.
Poitras, Steven , "The Nutanix Bible", https://nutanixbible.com/, Jun. 25, 2018, pp. all.
Poitras, Steven , "The Nutanix Bible", https://nutanixbible.com/, Jun. 8, 2017, pp. all.
Poitras, Steven , "The Nutanix Bible", http://stevenpoitras.com/the-nutanix-bible/ (Publication date based on indicated capture date by Archive.org; first publication date unknown), Jun. 9, 2015, pp. all.
Poitras, Steven , "The Nutanix Bible", https://nutanixbible.com/, Jun. 9, 2016, pp. all.
Poitras, Steven , "The Nutanix Bible", https://nutanixbible.com/, Mar. 2, 2021, pp. all.
Poitras, Steven , "The Nutanix Bible", http://stevenpoitras.com/the-nutanix-bible/ (Publication date based on indicated capture date by Archive.org; first publication date unknown), Oct. 15, 2013, pp. all.
Poitras, Steven , "The Nutanix Bible", https://nutanixbible.com/, Sep. 1, 2020, pp. all.
Poitras, Steven , "The Nutanix Bible", https://nutanixbible.com/, Sep. 17, 2019, pp. all.
Poitras, Steven , "The Nutanix Bible", https://nutanixbible.com/, Sep. 3, 2021, pp. all.
Poitras, Steven , "The Nutanix Bible", https://nutanixbible.com/, Sep. 4, 2015, pp. all.
Poitras, Steven , "The Nutanix Bible", https://nutanixbible.com/, Duplicate of ref. No. 72511, Mar. 2, 2020, pp. all.
Rajendran, Cedric , "Working with vSAN Health Checks", VMware vSan Virtual Blocks Blog; https://blogs.vmware.com/virtualblocks/2019/07/18/working-with-vsan-health-checks/, Jul. 18, 2019, pp. 1-6.
Ruth, Paul , "Autonomic Live Adaption of Virtual Computational Environments in a Multi-Domain Infrastructure", 2006 IEEE International Conference on Autonomic Computing, 2006, pp. 5-14.
Seget, Vladan , "VMware vSAN 7 now with native file services and quotas", 4sysops; https://4sysops.com/archives/vmware-vsan-7-now-with-native-file-services-and-quotas/, May 1, 2020.
Seget, Vladan , "VMware vSphere 7.0 and vSAN storage improvements", retrieved from: https://4sysops.com/archives/vmware-vsphere-7-0-and-vsan-storage-improvements/, Apr. 1, 2020, pp. 1-12.
Sturniolo, Andy , "VMware vSAN File Services and Veeam", Veeam Blog, https://www.veeam.com/blog/veeam-backup-vsan-file-services.html, Jul. 22, 2020, 1-9.

* cited by examiner

FILE SERVER MANAGERS AND SYSTEMS FOR MANAGING VIRTUALIZED FILE SERVERS

CROSS REFERENCE TO RELATED APPLICATION(S)

This application is a continuation of U.S. patent application Ser. No. 17/581,418 filed Jan. 21, 2022, which claims priority to U.S. Provisional Application No. 63/260,438, entitled "File Server Managers and Systems for Managing Virtualized File Servers," filed Aug. 19, 2021. The aforementioned applications are incorporated herein by reference, in their entireties, for any purpose.

TECHNICAL FIELD

Examples described herein relate generally to virtualized environments. Examples of file server managers are described which may communicate with one or more virtualized, distributed file servers. The virtualized, distributed file servers may each host a file system accessible to the file server manager.

BACKGROUND

Enterprises increasingly utilize multiple computing systems to store and manage the data of the organization. The systems utilized may include a number of virtualized systems on any number of hardware platforms. It may be increasingly cumbersome for an enterprise to manage these varied systems. For example, when virtualized systems are involved, it may be cumbersome to maintain and manage multiple virtualized systems—for example, to add, subtract, and/or modify virtual machines in the virtualized systems and/or to move data as needed in the virtualized system.

SUMMARY

An example file server manager disclosed herein includes at least one processor and non-transitory computer readable media encoded with instructions which, when executed by at least one processor, cause the file server manager to perform actions including receiving a registration for a distributed file server, where the distributed file server is hosted in a virtualization environment and includes a cluster of file server virtual machines configured to provide access to a file system. The actions further include synchronizing metadata with the distributed file server, the metadata including identification of each of the file server virtual machines of the cluster of file server virtual machines, the metadata including information regarding the file system and receiving a management request for the distributed file server. The actions further include formatting the management request for the virtualization environment based on the metadata and utilizing information from the registration to access the distributed file server with the formatted management request.

Example non-transitory computer readable media disclosed herein are encoded with instructions which, when executed, cause a system to perform actions including receiving a registration for a distributed file server, where the distributed file server is hosted in a virtualization environment and includes a cluster of file server virtual machines configured to provide access to a file system. The actions further include synchronizing metadata with the distributed file server, where the metadata includes identification of each of the file server virtual machines of the cluster of file server virtual machine, where the metadata further includes information regarding the file system. The actions further include receiving a management request for the distributed file server and formatting the management request for the virtualization platform based on the metadata. The actions further include utilizing information from the registration to access the distributed file server with the formatted management request.

An example method disclosed herein includes registering multiple virtualized distributed file servers with a file server manager, where a first virtualized distributed file server of the multiple virtualized distributed file servers is hosted on a virtualization environment including a cluster of file server virtual machines configured to provide access to a file system. The method further includes synchronizing metadata of the virtualized distributed file servers to a database of the file server manager. The metadata of the first virtualized distributed file server includes identification of each of the file server virtual machines of the cluster of file server virtual machines of the cluster of file server virtual machines and information regarding the file system. The method further includes receiving a management request at the file server manager and formatting the management request for one of the multiple virtualized distributed file servers in accordance with a virtualized environment in which the one of the multiple virtualized distributed file servers is implemented. The method further includes directing the management request to the one of the multiple virtualized distributed file servers based on the metadata synchronized to the database of the file server manager.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

DETAILED DESCRIPTION

Certain details are set forth herein to provide an understanding of described embodiments of technology. However, other examples may be practiced without various of these particular details. In some instances, well-known computing system components, virtualization operations, and/or software operations have not been shown in detail in order to avoid unnecessarily obscuring the described embodiments. Other embodiments may be utilized, and other changes may be made, without departing from the spirit or scope of the subject matter presented here.

Examples described herein include file server managers which may manage multiple virtualized file servers. The multiple virtualized file servers managed by a file server manager may be hosted by multiple computing node clusters (e.g., in multiple virtualization environments). The file server manager may be in communication with each of the multiple virtualized file servers. In this manner, a file server manager may provide a single pane of glass management interface to help manage and orchestrate file platform and service specific operations from a single location (e.g., a single logon and/or single user interface). File server managers may accordingly implement policies and conduct other operations based on data from multiple virtualized file servers in communication with the file server manager.

Figure 1:
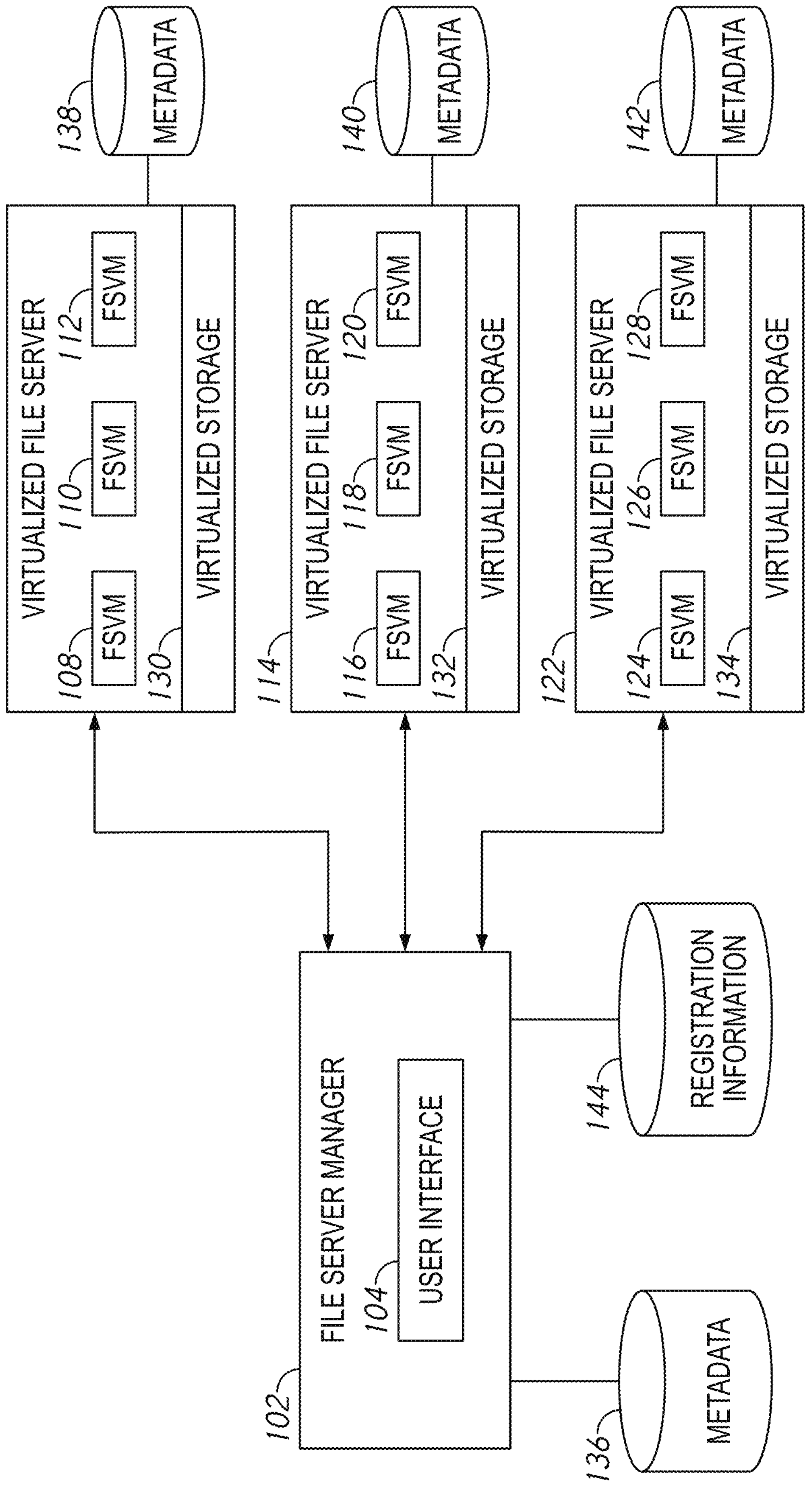
FIG. 1 is a schematic illustration of a system arranged in accordance with examples described herein.

FIG. 1 is a schematic illustration of a system arranged in accordance with examples described herein. The system of FIG. 1 includes file server manager 102. The file server manager 102 may provide user interface 104. The file server manager 102 may be in communication with memory and/or storage for metadata 136 and registration information 144. The system of FIG. 1 further includes virtualized file server 106, virtualized file server 114, and virtualized file server 122. The virtualized file server 106, virtualized file server 114, and virtualized file server 122 may each be in communication with the file server manager 102 (e.g., over one or more networks). Each of the virtualized file server 106, virtualized file server 114, and virtualized file server 122 may be hosted in a same and/or different virtualization environment. Each of the virtualized file server 106, virtualized file server 114, and virtualized file server 122 may include a cluster of computing nodes hosting a cluster of file server virtual machines (FSVM). For example, the virtualized file server 106 includes FSVM 108, FSVM 110, and FSVM 112. The virtualized file server 114 includes FSVM 116, FSVM 118, and FSVM 120. The virtualized file server 122 includes FSVM 124, FSVM 126, and FSVM 128. Each of the virtualized file server 106, virtualized file server 114, and virtualized file server 122 may include virtualized storage. For example, the virtualized file server 106 may include virtualized storage 130, the virtualized file server 114 may include virtualized storage 132, and the virtualized file server 122 may include virtualized storage 134. Moreover, each of the virtualized file server 106, virtualized file server 114, and virtualized file server 122 may include storage and/or memory for storing metadata. The virtualized file server 106 may store metadata 138. The virtualized file server 114 may store metadata 140. The virtualized file server 122 may store metadata 142.

The components shown in FIG. 1 are exemplary only. Additional, fewer, and/or different components may be used in other examples. For example, three virtualized file servers are depicted in FIG. 1, however any number may be used and may be in communication with the file server manager 102.

Examples of systems described herein may accordingly include one or more virtualized file servers, such as virtualized file server 106, virtualized file server 114, and virtualized file server 122 in FIG. 1. A virtualized file server may represent a logical entity in the system. Virtualized file servers described herein may be hosted in generally any virtualization environment (e.g., on generally any virtualization platform). The virtualization environment and/or platform generally refers to the storage resources that have been virtualized by the virtualized file server and the compute resources (e.g., computing nodes with processor(s)) used to manage the virtualized storage. For example, the virtualized file server 106 may be hosted on a different virtualization environment than the virtualized file server 114 and/or than the virtualized file server 122. Nonetheless, in some examples one or more virtualized file servers in communication with a file server manager may be hosted in a same virtualization environment. Examples of virtualization environments include, for example, on premises installations of one or more computing nodes and storage devices. Examples of virtualization environment include one or more cloud computing systems (e.g., Amazon Web Services, MICROSOFT AZURE). Although not shown explicitly in FIG. 1, virtualization environments and/or virtualized file servers may include additional components including, but not limited to, one or more hypervisors, storage controllers, operating systems, and/or container orchestrators (e.g., Kubernetes). The multiple virtualized file servers in communication with a file server manager described herein may in some examples be located in different geographic locations (e.g., different buildings, states, cities, or countries).

A virtualized file server may include a cluster of virtual machines and/or other virtualized entities (e.g., containers), which may be referred to as file server virtual machines (FSVMs). In some examples, each of the file server virtual machines of a cluster may be implemented on different computing nodes forming a computing node cluster. For example, the FSVM 108, FSVM 110, and FSVM 112 of virtualized file server 106 may each be implemented on separate computing nodes of a computing node cluster used by the virtualized file server 106. Similarly, the FSVM 116, FSVM 118, and FSVM 120 may each be implemented on separate computing nodes of a computing node cluster used by the virtualized file server 114. Similarly, the FSVM 124, FSVM 126, and FSVM 128 may each be implemented on separate computing nodes of a computing nodes cluster. In some examples, a cluster of FSVMs may be implemented on a cloud computing system.

The FSVMs may operate to provide a file system on the storage resources of the virtualized file server. The file system may have a single namespace and may store data in accordance with filenames and/or directories. The FSVMs may accordingly support one or more file system protocols, such as NFS and/or SMB. A virtualized file server (such as virtualized file server 106, virtualized file server 114, and/or virtualized file server 122) may translate file system protocol requests for one or more files and/or directories (e.g., a file path) into one or more storage requests to access the data corresponding to the file, directory, and/or file path. Any of a variety of components of the virtualized file server may be used to perform the translation (e.g., one or more FSVMs, one or more hypervisors, and/or one or more storage controllers). The translation may be performed using a map (e.g., a shard map) relating the location of the data to the file name, share, directory, and/or file path.

Virtualized file servers described herein may include virtualized storage. For example, the virtualized file server 106 may include virtualized storage 130. The virtualized file server 114 may include virtualized storage 132. The virtualized file server 122 may include virtualized storage 134. The virtualized storage may generally include any number or kind of storage devices—for example, network attached storage, local storage of one or more computing nodes forming the virtualized file server, and/or cloud storage. Storage devices may be implemented using, for example one or more memories, hard disk drives, solid state drives. The virtualized storage for a particular virtualized file server may be referred to as a storage pool. The virtualized storage may store one or more shares. Generally, the virtualized storage may refer to a storage pool which may include any of a variety of storage devices. In some examples, the virtualized file server(s) may be implemented in a hyperconverged architecture. For example, the storage pool may include local storage devices of the computing nodes used to host the virtualized file server. For example, virtualized storage 130 may include a storage pool. One or more shares of a file system provided by the virtualized file server 106 may be distributed across storage device of the storage pool, including local storage devices of one or more computing nodes on which the FSVM 108, FSVM 110, and/or FSVM 112 reside. In some examples, each file server virtual machine (FSVM) may manage (e.g., host) a corresponding share or portion of a share. A map may store associations between shares and files, directories, and/or file paths.

Virtualized file servers described herein may include metadata. For example, virtualized file server 106 may include metadata 138. The virtualized file server 114 may include metadata 140. The virtualized file server 122 may include metadata 142. The metadata may be stored, for example, in the virtualized storage and/or other storage location accessible to the virtualized file server. The metadata may in some examples be distributed across the storage pool of a virtualized file server. In some examples, the metadata may be stored in a database accessible to and/or hosted by the virtualized file server. Metadata stored by a virtualized file server may include, for example, authentication information for the virtualized file server and/or virtual machines in the virtualized file server, authorization information for the virtualized file server and/or virtual machines in the virtualized file server, configuration information for the virtualized file server and/or virtual machines in the virtualized file server, end point information (e.g., supported API calls and/or endpoints), a number of shares stored in the virtualized storage of the virtualized file server, a protocol supported by each share and/or FSVM (e.g., NFS and/or SMB), identities of the shares stored in the virtualized storage of the virtualized file server, a number of file server virtual machines (FSVMs) present in the virtualized file server, a number of files and/or directories hosted by the virtualized file server, compute resources available and/or used at the virtualized file server, storage resources available and/or used at the virtualized file server, or other metadata regarding the virtualized file server. The metadata may be maintained by the virtualized file server, for example, the metadata may be updated as the number of shares, FSVMs, storage resources and/or compute resources change.

Examples described herein may include a file server manager, such as file server manager 102 of FIG. 1. A file server manager may be in communication with multiple virtualized file servers. For example, the file server manager 102 may be in communication with virtualized file server 106, virtualized file server 114, and virtualized file server 122. In this manner, the file server manager 102 may allow for access to, maintenance of, and/or management of multiple virtualized file servers (e.g., multiple file systems). An enterprise may have many virtualized file servers that are desired to be managed—for example, different geographic locations of the enterprise may maintain separate file systems and/or implement different privacy or other data policies. In some examples, different departments or entities within an organization may maintain respective virtualized file servers. An administrator or other entity associated with the enterprise, such as an IT manager, may advantageously view, access, and/or manage multiple virtualized file servers using the file server manager (e.g., file server manager 102). The file server manager may communicate with each virtualized file server using any of a variety of connections, including one or more networks. In some examples, a same network may be used to communicate between the file server manager and multiple virtualized file servers. In some examples, multiple networks may be used.

File server managers, such as file server manager 102 of FIG. 1 may be implemented using one or more computing devices. In some example, an administrative computing system may be used. The administrative computing system may include, for example, one or more processors and non-transitory computer readable media encoded with instructions for performing the file server manager operations described herein. In some examples, the file server manager may be implemented using a computing device different than the computing devices (e.g., computing nodes) used to implement the virtualized file server(s) with which the file server manager is in communication. In some examples, the file server manager may be hosted on one of the computing nodes forming a part of a virtualized file server in communication with the file server manager. File server managers, such as file server manager 102, may be hosted on premises systems in some examples, and/or on cloud computing systems in some examples.

Examples of file server managers described herein may provide one or more user interfaces, such as user interface 104 of FIG. 1. The user interface may allow a user (e.g., a human administrator and/or another computer process) to view information regarding multiple virtualized file servers, to communicate with multiple virtualized file servers, to manage multiple virtualized file servers, and generally to offer a single pane of glass interface to the multiple virtualized file servers in communication with the file server manager. The user interface may be implemented, for example, using one or more display(s) and one or more input and/or output device(s) (e.g., mouse, keyboard, touchscreen, etc.). In some examples, user interface 104 of file server manager 102 may be used to depict one or more of the virtualized file server 106, virtualized file server 114, and/or virtualized file server 122. For example, the identity and number of shares used by the virtualized file servers may be displayed. In some examples, the number and identity of computing nodes and/or FSVMs in each of the virtualized file servers may be displayed. Other attributes of the virtualized file servers may additionally or instead be displayed using a user interface of a file server manager. The data used in the display may wholly and/or partially be obtained from the registration information and/or metadata synchronized with one or more of the virtualized file servers.

Examples of file server managers described herein may store registration information, such as registration information 144 of FIG. 1. The registration information 144 may include information regarding each virtualized file server in communication with the file server manager. The registration information may include information used to manage, communicate with, and/or otherwise interact with the virtualized file server. Examples of registration information include a name of the virtualized file server, an identification of the virtualization environment hosting the virtualized file server, credentials for one or more FSVMs in the virtualized file server, IP addresses or other addresses for the virtualized file server, FSVMs in the virtualized file server, or other components of the virtualized file server. During setup of a system including a file server manager, the virtualized file servers may be registered with the file server manager, and may provide registration information to the file server manager. The registration information may be stored by the file server manager, such as in registration information 144, which may be a database in some examples. The registration information may be stored on a memory and/or other storage device accessible to the file server manager.

Examples of file server managers described herein may include metadata, such as metadata 136. The metadata may be synchronized to the metadata of multiple virtualized file servers in communication with the file server manager. For example, the metadata 136 may be synchronized with metadata 138, metadata 140, and metadata 142. For example, the metadata 136 at any given time may include metadata 138, metadata 140, and metadata 142.

Synchronization may be maintained over time—the metadata of multiple virtualized file servers may periodically (e.g., at regular and/or irregular intervals) synchronize with the metadata store of the file server manager. In this manner, the file server manager 102 may maintain an updated storage of metadata associated with each of virtualized file server 106, virtualized file server 114, and virtualized file server 122. The metadata may be accessed by the file server manager and used to manage, communicate with, and/or otherwise interact with the virtualized file servers.

While the metadata 136 and registration information 144 are depicted separately in FIG. 1, they may be wholly and/or partially stored on a same storage device in some examples. The metadata 136 may be stored, for example, in a database. The registration information 144 may be stored, for example, in a database. Any of a variety of database synchronization techniques may be used to synchronize the metadata of the file server manager with the metadata of multiple virtualized file servers.

During operation, a file server manager described herein may register, such as by receiving a registration for, one or more virtualized file servers. For example, a virtualized file server (e.g., using an FSVM, a hypervisor, and/or another component of the virtualized file server), may transmit a registration (e.g., registration information) to the file server manager. In some examples, the file server manager may request such a registration by transmitting a request to register to the virtualized file server. In some examples, such as when the file server manager is hosted on a cluster and/or within a same system as the virtualized file server, an automatic registration may occur. For example, the registration process may include determining (e.g., from one or more IP addresses used), that a virtualized file server is hosted on a same domain as a file server manager. In other examples, virtualized file servers which are not hosted on a same domain as a file server manager may nonetheless register with the file server manager. In the example of FIG. 1, the file server manager 102 may request registration from virtualized file server 106, virtualized file server 114, and virtualized file server 122. For example, a system administrator may enter an IP address, name, or other identifier to request a registration from virtualized file server 106, virtualized file server 114, and/or virtualized file server 122. In some examples, a system administrator or other user or component may transmit a registration from virtualized file server 106, virtualized file server 114, and/or virtualized file server 122, which registration may or may not be responsive to a request. In some examples, the operating system of one or more computing nodes of the virtualized file server hosting an FSVM may provide a registration request to the file server manager. The registration may include registration information which file server manager 102 may store in registration information 144.

The file server manager may synchronize metadata of registered file servers such that up to date metadata of the registered file server may be accessible to the file server manager. For example, the metadata 136 may synchronize with metadata 138, metadata 140, and metadata 142 of FIG. 1. Any and/or all types of metadata of the virtualized file server may be synched with a file server manager. For example, a number and identity of shares of each virtualized file server may be synchronized with the file server manager. In some examples, compute and/or storage resource usage may additionally or instead be synchronized between a virtualized file server and the file server manager. Sharding or other maps and/or portions thereof may be synchronized between a virtualized file server and the file server manager. Other metadata may be synchronized additionally or instead.

During operation, file server managers described herein, such as file server manager 102 of FIG. 1 may receive a management request for a particular virtualized file server. The management request may be received, for example by a client which may be hosted on a client system, on a system also hosting the file server manager, and/or on a system hosting all or a portion of one of the virtualized file servers in communication with the file server manager. In some examples, the management request may be implemented using an API call. In this manner, a file server manager may provide an API endpoint to receive API calls for one or more virtualized file servers. Examples of management requests include requests for accessing, managing, and/or maintaining the virtualized file server. For example, a management request may be a request to add and/or subtract one or more FSVMs, add and/or subtract one or more shares in the storage, and/or upgrade one or more FSVMs.

The file server manager may format the received management request for the virtualization environment (e.g., virtualization platform) used to host the requested virtualized file server. For example, the file server manager may access the registration information 144 to identify a virtualization environment for a virtualized file server identified in the management request. The management request may then be formatted in a manner used by the virtualized environment. In some examples, the formatted management request may be implemented as an API call, with the API call specific to the virtualization environment of the target virtualized file server. In this manner, clients or other users providing management requests to the file server manager may not require knowledge of the virtualized environment hosting the virtualized file server. The file server manager may format the request in the manner used to communicate with the appropriate virtualization environment. This may provide flexibility in system design and usage, as multiple virtualization environments may be used, and virtualized file servers may in some examples be relocated from one virtualized environment to another without a need to update management requests being provided to the file server manager. Instead, an updated identification of the virtualized environment may be stored in registration information 144 and/or metadata 136.

During operation, the file server manager may utilize information (e.g., file server metadata) from the registration to implement the management request. For example, access credentials provided during registration may be used to access one or more FSVMs and/or other components of the virtualized file server (e.g., hypervisor, other virtual machine (s) and/or container(s)) and implement the management request. In some examples, the management request may be provided to a particular FSVM. In some examples, the management request may be provided to an FSVM of the virtualized file server that is designated as a leader, and the leader FSVM may communicate the management request to an appropriate FSVM of the virtualized file server.

In some examples, file server managers described herein, such as file server manager 102 of FIG. 1, may be used to implement one or more cross-file server policies. A cross-file server policy may generally refer to a policy that accesses and/or utilizes more than one file server in implementing the policy. For example, one virtualized file server may be used (e.g., designated) as a destination file server and another virtualized file server may be used (e.g., designated) as a source file server. For example, the file server manager 102 may designate virtualized file server 106 as a source file server and virtualized file server 114 as a destination file server. The file server manager 102 may then utilize virtualized file server 106 to replicate, backup, provide redundancy for, or otherwise receive data from virtualized file server 106. For example, the file server manager 102 may implement a replication policy from virtualized file server 106 to virtualized file server 114. Without the presence of file server manager 102 in some examples, the virtualized file server 106 may have been used to implement a replication policy to virtualized file server 114 directly. However, utilizing file server manager 102 provides for central cross-server management and avoids a need for individual file servers to communicate with one another directly.

Figure 2:
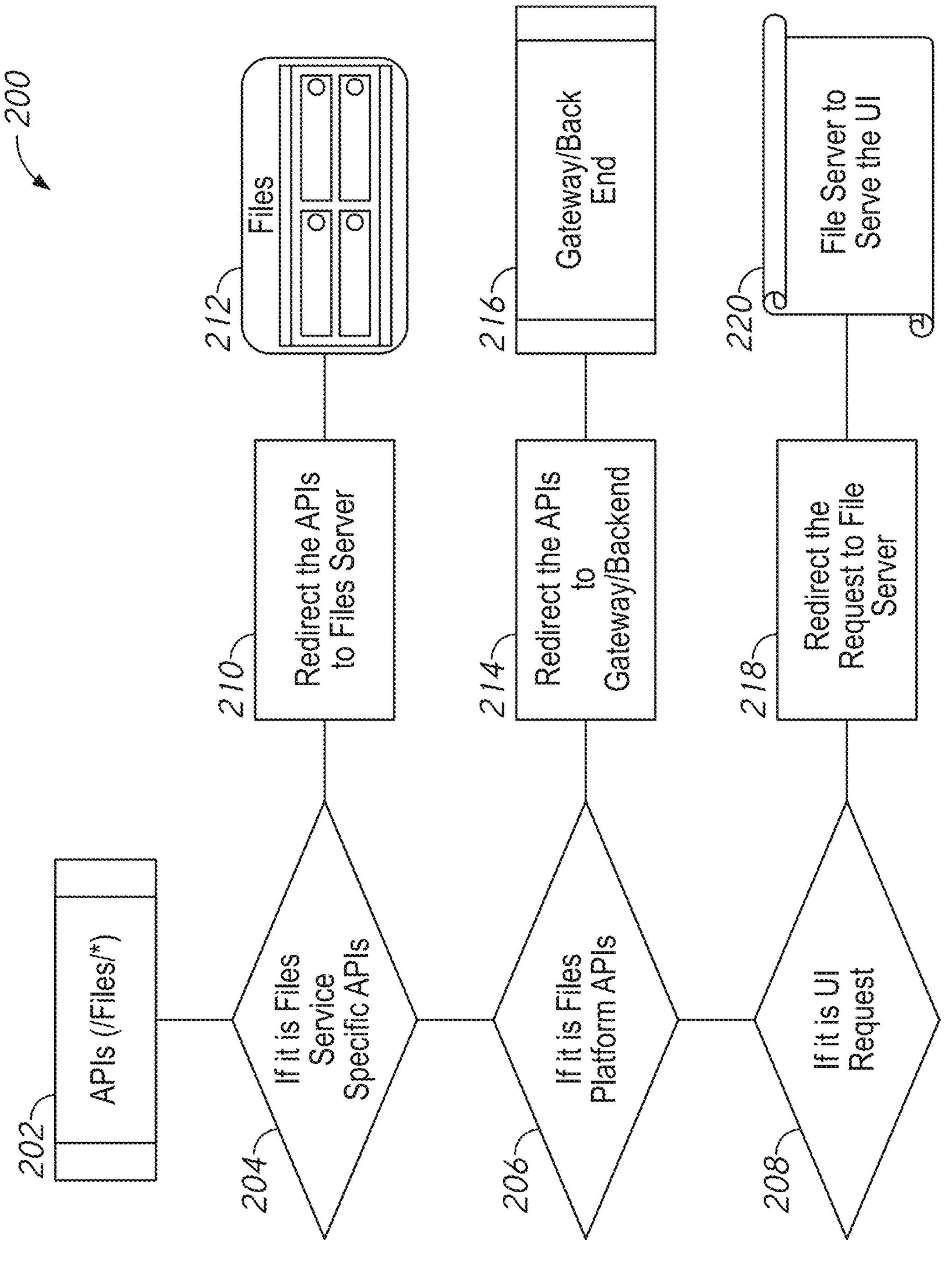
FIG. 2 is a flowchart depicting a method of processing requests received at a file server manager arranged in accordance with examples described herein.

FIG. 2 is a flowchart depicting a method of processing requests received at a file server manager arranged in accordance with examples described herein. The flowchart 200 depicts management requests that may be provided to a file server manager as one or more API calls, such as API call 202. The flowchart 200 includes evaluating the type of management request—is it files service specific in block 204, is it files platform specific in block 206, is it a UI request in block 208. Responsive to a determination the management request is files service specific in block 204, the flowchart 200 indicates the API may be redirected to a virtualized file server in block 210, and may be provided, for example, to virtualized file server 212. Responsive to a determination the management request is files platform specific in block 206, the request may be directed to a gateway or backend in block 214, such as gateway 216. Responsive to a determination the management request is a UI request, it may be redirected to a file server in block 218, such as file server 220, which may be a virtualized file server. The blocks and components of flowchart 200 are exemplary, and the blocks and component may occur in different orders in some examples, and additional and/or fewer blocks or components may be used in some examples.

The method depicted by flowchart 200 may be implemented by file server managers described herein, such as by file server manager 102 of FIG. 1.

In block 202, an API call 202 may be received, which may also be referred to as a management request. The API call 202 may be implemented, for example, using a REST API. The API call 202 may be received from an administrator (e.g., using an interface to a file server manager, such as user interface 104 of FIG. 1). The API call 202 may be received from a computing system (e.g., a client computing system) in communication with a file server manager described herein. In some examples the request may come from an automation script that may be executing on, for example a computing system in communication with the file server manager and/or on the file server manager itself. In some examples, the API call may be received from (e.g., may be sent by) a virtualized file server in communication with the file server manager, such as virtualized file servers 106, virtualized file server 114, and/or virtualized file server 122 of FIG. 1. The API call may be received from a virtual machine and/or container. For example, the API call may be received from a user virtual machine and/or container which may be hosted on a same computing node of as one of the FSVMs of the virtualized file server. The API call may be used to implement a management request as described herein. The API call may not be specific to the type of platform (e.g., virtualization platform) hosting a virtualized file server. In this manner, the API call may be agnostic to platform type. The file server manager may accordingly provide an API endpoint for management requests directed to one or more virtualized file servers.

The file server manager may evaluate the management request received, e.g., API call 202. For example, the file server manager 102 may receive API call 202 and may evaluate it to determine how to direct the API call. The management request may be evaluated to determine its intended destination. For example, the file server manager 102 may evaluate a management request to determine if it is files service specific (e.g., in block 204), if it is directed toward a files platform (e.g., block 206), and/or if it is a UI request (e.g., block 208). The evaluation may be based, for example, on identifying that the content of the request pertains to files services, files platform, and/or UI. The evaluation may be based, for example, on identifying a destination of the request.

If the management request (e.g., API call 202) is determined to be a files service specific request in block 204, the request may be redirected to the appropriate virtualized file server in block 210. Examples of files service specific requests include requests to create a share, create or revise one or more user quotas for the virtualized file server, monitor a number of users connected to a virtualized file server, or blocking one or more particular users of the virtualized file server. Files service specific requests may not need to be translated for the particular virtualization platform of the virtualized file server, because in some examples they may requests which are received and/or processed by one or more file server virtual machines (FSVMs) or another component of the virtualized file server (e.g., hypervisor, daemon, or other service). In redirecting to a virtualized file server, the file server manager may in some examples format the request in a manner suitable for the virtualized file server, such as the virtualized file server 212. In some examples, the file server manager may format the request in a manner suitable for a particular version of file server virtual machine operating in the requested virtualized file server. In some examples, the file server manager may receive a request for a virtualized file server that the particular version of file server virtual machine used may not support. The file server manager may identify the version of file server virtual machine (e.g., by accessing metadata and/or registration information) and may replace the unsupported request with a supported request able to be received and processed by the version of file server virtual machine in operation.

If the management request (e.g., API call 202) is determined to be a files platform request (e.g., create one or more FSVMs, scale-in the virtualized file server, scale-out the virtualized file server, add storage to the virtualized file server), then management request may be redirected to a gateway or backend for the appropriate virtualized file server in block 214, such as gateway 216. In redirecting the request, the file server manager may format the request for the particular virtualization platform (e.g., virtualization environment) on which the virtualized file server is hosted. For example, the management request may be formatted for the compute and storage resources used in a particular environment such as a NUTANIX platform, an AMAZON WEB SERVICES platform, a MICROSOFT AZURE platform, etc.

The file server manager may access a database or other stored location to determine the platform hosting the requested virtualized file server (e.g., registration information 144 in FIG. 1). Based on the identity of the platform, the management request may be formatted for the platform (e.g., by utilizing platform-specific API calls in some examples). In this manner, an administrator or other user may manipulate a virtualized file server—e.g., to expand the virtualized file server-without requiring knowledge on behalf of the administrator of what platform is hosting the virtualized file server.

If the management request (e.g., API call 202) is determined to be a UI request, it may be redirected to a file server in block 218, such as file server 220, which may be a virtualized file server. UI requests may include, for example, requests to view the current compute resource usage, storage resources usage, number of shares, identity of shares, and/or files or directories hosted by a particular virtualized file server. In redirecting the request to a file server in block 218, the file server manager may format the request in a manner particular to the file server and/or the UI of the file server.

Accordingly, using methods such as depicted in flowchart 200 of FIG. 2, file server managers described herein may receive and redirect management requests, such as API calls. The API calls may be selected and/or formatted in a manner particular to a virtualized file server and/or a virtualization environment.

Figure 3:
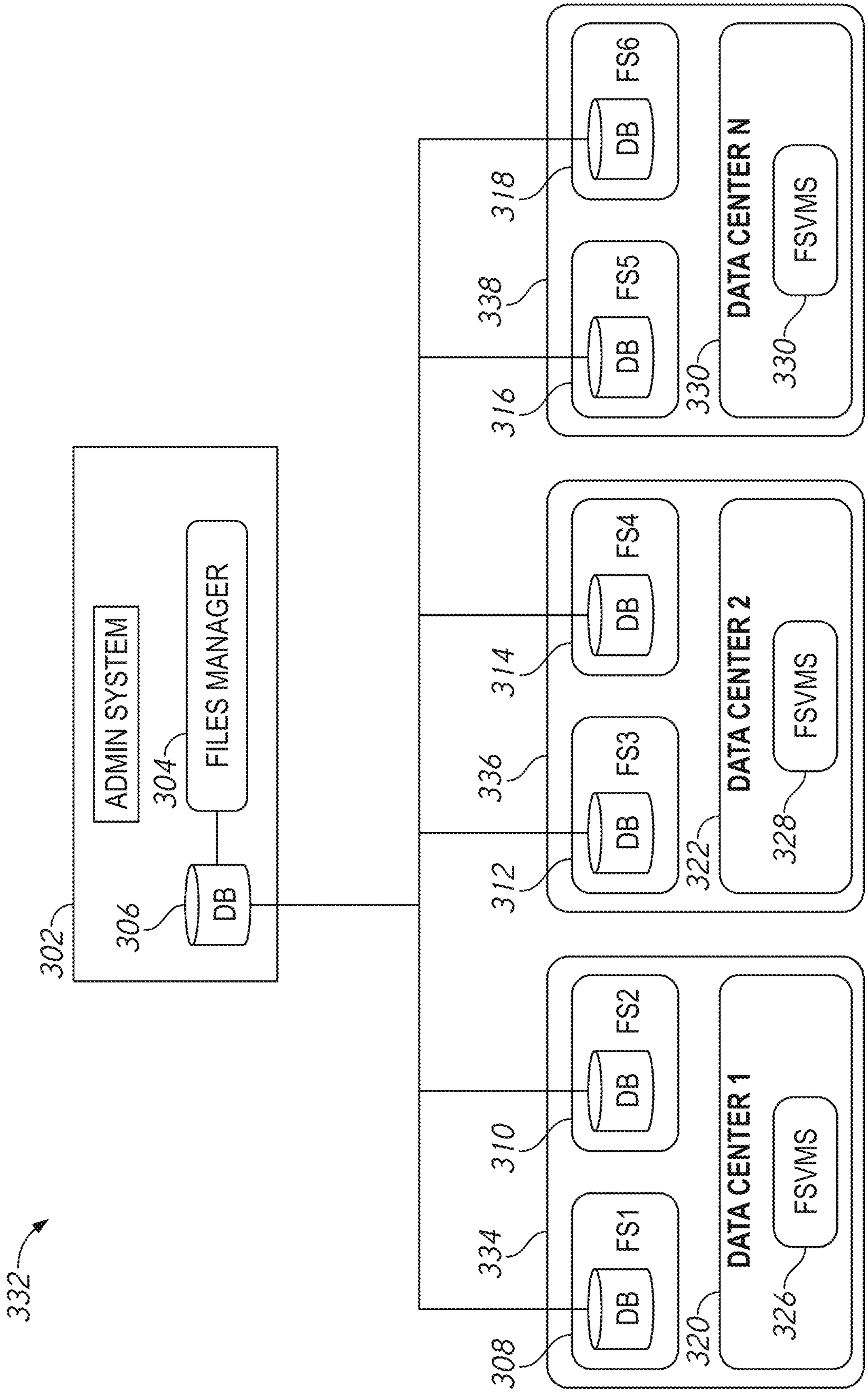
FIG. 3 is a schematic illustration of a system arranged in accordance with examples described herein.

FIG. 3 is a schematic illustration of a system arranged in accordance with examples described herein. The system 332 includes an admin system 302 in communication with virtualized file server 334, virtualized file server 336, and virtualized file server 338. The virtualized file server 334 is hosted on virtualization platform 320. The virtualized file server 336 includes FSVMs 326 and is hosted on virtualization platform 322. The virtualized file server 336 provides file system 308 and file system 310. The virtualized file server 338 includes FSVMs 328 and is hosted on virtualization platform 324. The virtualized file server 338 provides file system 312 and file system 314. The virtualized file server 338 includes FSVMs 330 and is hosted on virtualization platform 324. The virtualized file server 338 provides file system 316 and file system 318. The admin system 302 includes file server manager 304 and database 306. The components shown in FIG. 3 are exemplary only.

Additional, fewer, and/or different components may be used in other examples.

In some examples, the system 332 of FIG. 3 may be used to implement and/or may be implemented by the system of FIG. 1, or portions thereof. For example, the file server manager 304 may be implemented using file server manager 102. The database 306 may be used to implement and/or may be implemented using registration information 144 and/or metadata 136. The virtualized file server 334, virtualized file server 336, and virtualized file server 338 may be used to implement and/or implemented by virtualized file server 106, virtualized file server 114, and virtualized file server 122, respectively.

While three virtualized file servers are shown in FIG. 3, generally any number may be provided and may be in communication with file server manager 304. Each virtualized file server in FIG. 3 is shown as providing 2 file systems. However, generally, any number of file systems may be provided by a particular virtualization environment and/or virtualized file server-including 1, 2, 3, 4, 5, 6, 7, 8, 9, or more file systems.

The example of FIG. 3 illustrates the synchronization of metadata between file systems and/or virtualized file servers and a file server manager. The file server manager 304 is in communication with database 306. While referred to as a database, the database 306 may be implemented using any data stores and/or structures, including one or more distributed databases. The file server manager 304 may maintain, access, write to and/or read from the database 306.

Each file system provided by a virtualized file server may have associated metadata. The file system metadata is depicted in FIG. 3 as a database associated with the file system. For example, the file system 308, 'FS1', has a database of metadata. The file system 310, 'FS2', has a database of metadata. The file system 312, 'FS3', has a database of metadata. The file system 314, 'FS4', has a database of metadata. The file system 316, 'FS5', has a database of metadata. The file system 318, 'FS6', has a database of metadata. The various file system metadata may be provided by and/or in communication with the virtualization platform hosting the file system. For example, the metadata database for file system 308 and file system 310 may be hosted by virtualization platform 320—e.g., may be stored in and/or distributed across storage devices of a storage pool provided by the virtualization platform 320, which may include the storage of one or more computing nodes used to host FSVMs 326 or other components providing the virtualized file server. The metadata database for file system 312 and file system 314 may be hosted by virtualized file server 336—e.g., may be stored in and/or distributed across storage devices of a storage pool provided by the virtualized file server 336, which may include the storage of one or more computing nodes used to host FSVMs 328. The metadata database for file system 316 and file system 318 may be hosted by virtualized file server 338—e.g., may be stored in and/or distributed across storage devices of a storage pool provided by the virtualized file server 338, which may include the storage of one or more computing nodes used to host FSVMs 330. Note that, while the file systems are shown as separate boxes in FIG. 3, the file systems may be implemented using one or more FSVMs and virtualized storage provided by the virtualization environment.

The database 306 may be used to store metadata and maintain synchronization between the metadata and the metadata of each of the file systems and/or virtualized file servers in communication with the file server manager 304. The file server manager 304 and/or admin system 302 may provide one or more synchronization processes which conduct synchronization between the database 306 and the metadata associated with file system 308, file system 310, file system 312, file system 314, file system 316, and/or file system 318. As metadata is created, destroyed, and/or changed at the virtualized file servers, the changes may be synchronized with the database 306. In this manner, the file server manager 304 may maintain access to accurate information regarding the metadata of one or more connected virtualized file servers. The metadata may be used to administer, manage, and/or access the virtualized file servers and/or file systems. Examples of metadata stored by a virtualized file server and/or file system may include, for example, authentication information for the virtualized file server and/or virtual machines in the virtualized file server, authorization information for the virtualized file server, file system, and/or virtual machines in the virtualized file server, configuration information for the virtualized file server and/or virtual machines in the virtualized file server, end point information (e.g., supported API calls and/or endpoints), a number of shares stored in the virtualized storage of the virtualized file server and/or file system, identities of the shares stored in the virtualized storage of the virtualized file server, a number and/or identification of computing nodes and/or file server virtual machines (FSVMs) present in the virtualized file server, a number of files and/or directories hosted by the virtualized file server and/or file system, information about the file system of the virtualized file server, compute resources available and/or used at the virtualized file server, storage resources available and/or used at the virtualized file server, or other metadata regarding the virtualized file server.

Accordingly, in FIG. 3, the various virtualized file server databases containing metadata regarding their file system are shown connected to the database 306 of the file server manager 304. As changes in the metadata stored at the various virtualized file servers occur, they may be synchronized with the database 306 of the file server manager 304. The metadata may be communicated, for example over a network, between the virtualized file servers and the file server manager 304 for storage in the database 306. Synchronization may include periodic updates in some examples.

In operation, the file server manager 304 may access the database 306 to access metadata regarding one or more of the virtualized file servers to aid in managing, accessing, and/or displaying or otherwise reporting on the status of the virtualized file servers.

Figure 4:
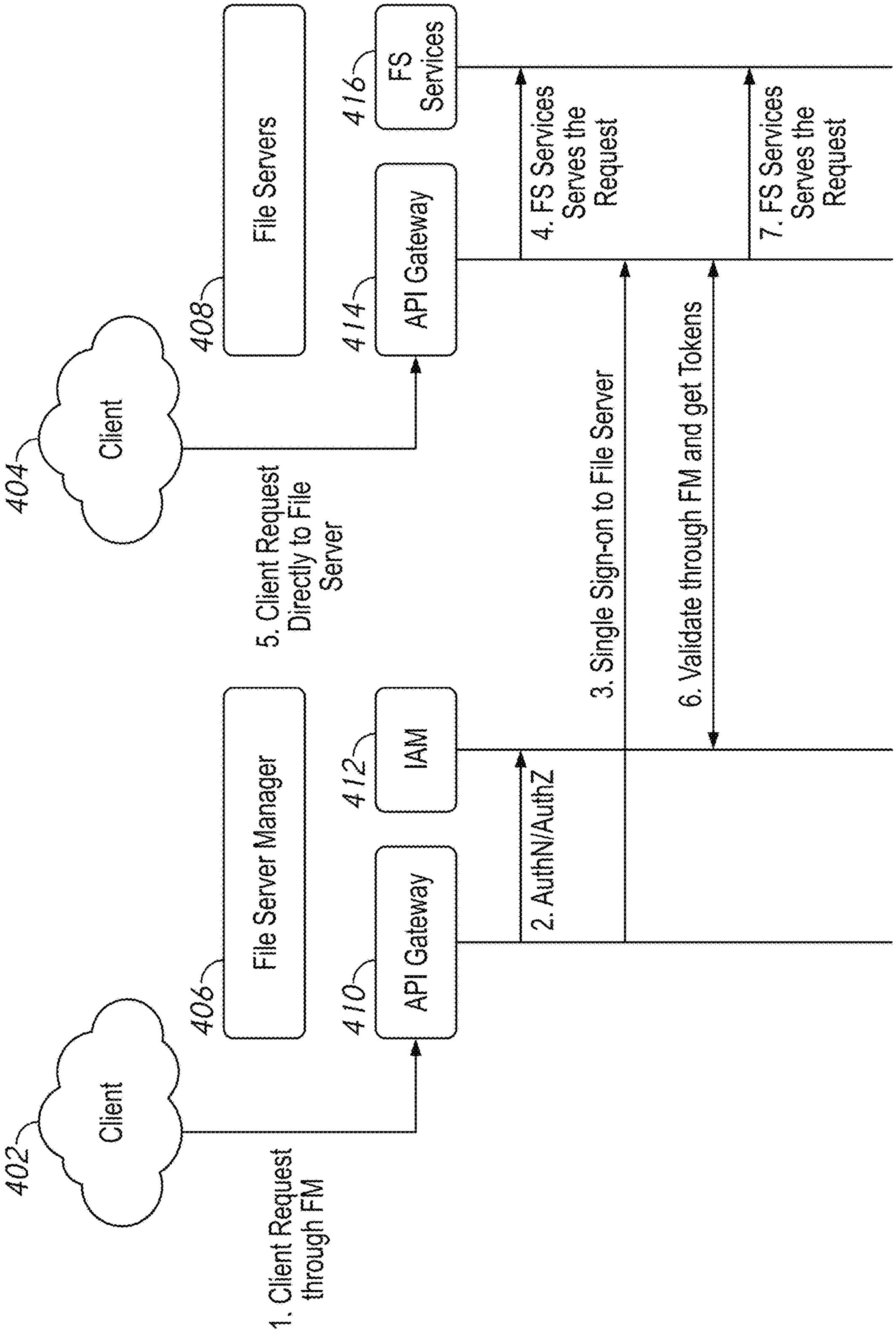
FIG. 4 is a schematic illustration of a security workflow arranged in accordance with examples described herein.

FIG. 4 is a schematic illustration of a security workflow arranged in accordance with examples described herein. FIG. 4 illustrates components and operations performed by client 402, client 404, file server manager 406, and/or virtualized file servers 408. The file server manager 406 may provide API gateway 410 and authentication process 412. One or more virtualized file servers 408 may each provide an API gateway 414 and file services 416. The various operations in a security workflow are shown as numbered operations occurring between components as shown. The workflow of FIG. 4 is exemplary, and additional, fewer, and/or different components and/or operations may be used in other examples.

The file server manager 406 may be used to implement and/or may be implemented by other file server managers described herein, such as file server manager 102 of FIG. 1, and/or file server manager 304 of FIG. 3. Similarly, the virtualized file servers 408 may be used to implement and/or may be implemented by virtualized file servers described herein, such as virtualized file server 106, virtualized file server 114, and/or virtualized file server 122 of FIG. 1 or virtualized file server 334, virtualized file server 336, and/or virtualized file server 338 of FIG. 3.

During operation of a security workflow, a client may provide a request to a file server manager, such as file server manager 406. The request may be provided to a gateway, such as an API gateway of the file server manager 406, such as API gateway 410. The client may be, for example, an administrator, a process (e.g., an automation script), a virtual machine and/or a container. In some examples, the client may be hosted by a computing node used to host a portion of the virtualized file server (e.g., a computing node having an FSVM). The request may be a management request to perform an operation on or for a virtualized file server. The request may include a request to authenticate and/or authentication credentials. The client may be authenticated by communicating with an authentication process provided by the file server manager, such as authentication process 412 of FIG. 4. The authentication process may be, for example, an identity access management (IAM) process. In some examples, role-based access (RBAC) may be used. The file server manager 406 may support role-based access, for example, by using a role-based authentication process.

Once authenticated, e.g., by authentication process 412, the API gateway 410 may implement a single-sign on to a file server, such as one or more of virtualized file servers 408. Accordingly, in some examples, credentials used to authenticate to the file server manager 406 may be the same used to sign on to one or more virtualized file servers. In some examples, the credentials may not be the same, however once authenticated to the file server manager 406, the file server manager 406 may select the appropriate credentials for sign-on to a virtualized file server, and provide the credentials to the virtualized file server (e.g., to one or more FSVMs, hypervisor(s), daemon(s), and/or other components of the virtualized file server). The sign-on credentials may be provided to a gateway of the virtualized file server, such as API gateway 414 of virtualized file servers 408. Once signed on, the virtualized file server may receive and process the request, e.g., the management request. As described herein, the file server manager 406 may format the request in a manner particular to a virtualization environment of the virtualized file server. Accordingly, the file services 416 may service the request. The file services 416 may include, for example, one or more FSVMs used to implement the virtualized file server. In some examples, the file services 416 may include one or more storage controllers or other virtualization components (e.g., hypervisor(s)).

In some examples, a client may provide a request directly to one or more virtualized file servers. For example, the client 404 is shown in FIG. 4 providing a request directly to API gateway 414 of one of virtualized file servers 408. When the virtualized file server is being managed by the file server manager 406, the request provided directly to one or more of the virtualized file servers 408 may be validated by the file server manager 406, and authentication token(s) provided in response. Following authentication, the request may be serviced by virtualized file server, e.g., by file services 416.

In this manner, file server managers may provide single sign-on capabilities for one or multiple virtualized file servers. A centralized authentication process, such as an identity access management process, may manage authentication and authorization policies for one or more virtualized file servers.

Figure 5:
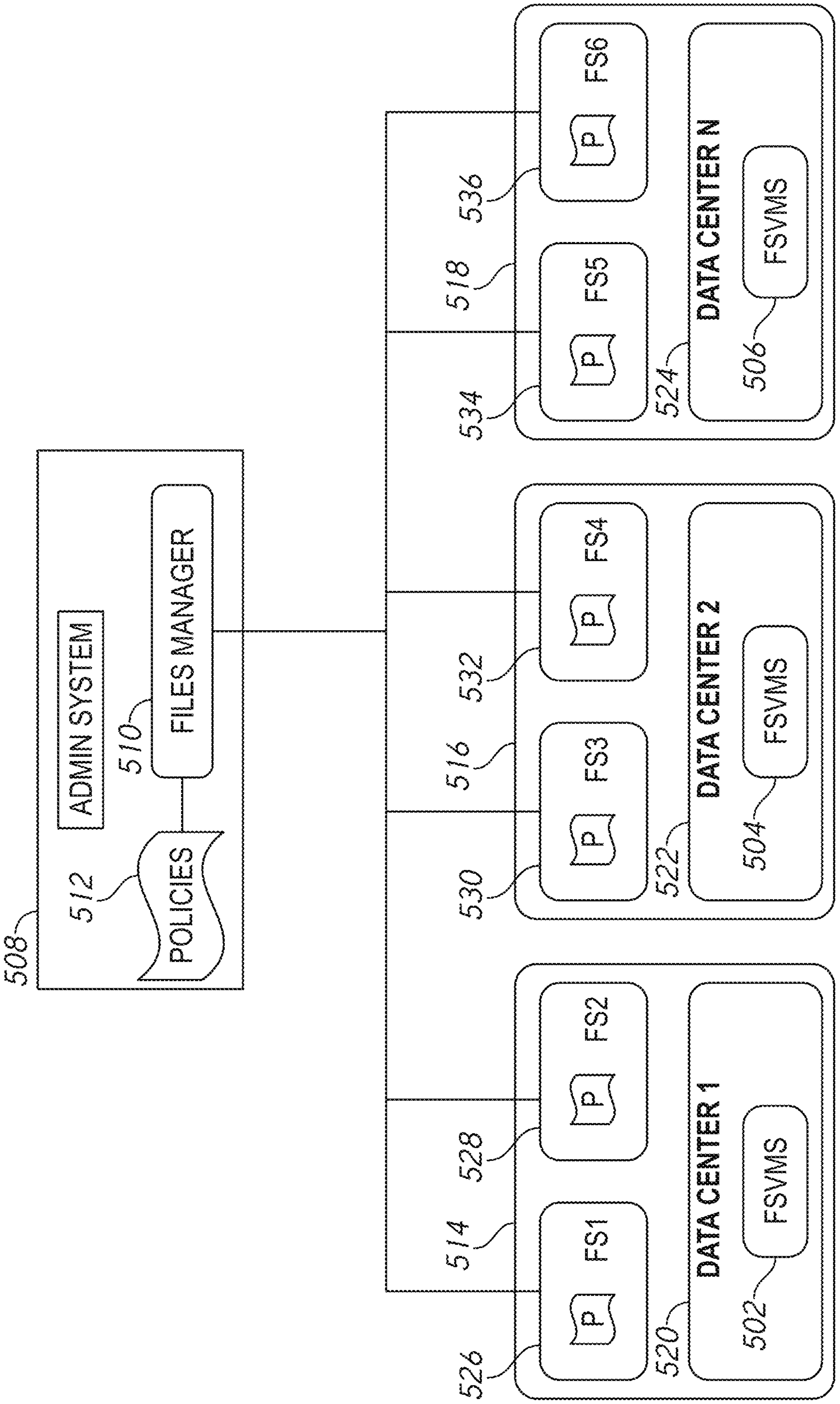
FIG. 5 is a schematic illustration of a system arranged in accordance with examples described herein.

FIG. 5 is a schematic illustration of a system arranged in accordance with examples described herein. The system of FIG. 5 includes an admin system 508 in communication with virtualized file server 514, virtualized file server 516, and virtualized file server 518. The virtualized file server 514 includes FSVMs 502 and is hosted on virtualization platform 520. The virtualized file server 514 provides file system 526 and file system 528. The virtualized file server 516 includes FSVMs 504 and is hosted on virtualization platform 522. The virtualized file server 516 provides file system 530 and file system 532. The virtualized file server 518 includes FSVMs 506 and is hosted on virtualization platform 524. The virtualized file server 518 provides file system 534 and file system 536. The admin system 508 includes file server manager 510 and policies 512. The components shown in FIG. 5 are exemplary only. Additional, fewer, and/or different components may be used in other examples.

In some examples, the system of FIG. 5 may be used to implement and/or may be implemented by the system of FIG. 1, the system of FIG. 3 or portions thereof. For example, the file server manager 510 may be implemented using file server manager 102 and/or file server manager 304. The virtualized file server 514, virtualized file server 516, and virtualized file server 518 may be used to implement and/or may be implemented by virtualized file server 334, virtualized file server 336, and virtualized file server 338 of FIG. 3 and/or virtualized file server 106, virtualized file server 114, and virtualized file server 122, respectively.

While three virtualized file servers are shown in FIG. 5, generally any number may be provided and may be in communication with file server manager 510. Each virtualized file server in FIG. 5 is shown as providing 2 file systems. However, generally, any number of file systems may be provided by a particular virtualization environment and/or virtualized file server-including 1, 2, 3, 4, 5, 6, 7, 8, 9, or more file systems.

The example of FIG. 5 illustrates a file server manager which may implement one or more policies on behalf of one or more virtualized file servers. In some examples, cross-server file policies may be implemented. Policies 512 are shown accessible to file server manager 510. The policies may be generally stored on a memory and/or storage device accessible to file server manager 510. Generally, a policy refers to a particular plan of operations to be carried out on one or more file servers under specified conditions. Policies may be provided for upgrade, scale up, scale down, redundancy, backup, and/or tiering, as examples. In FIG. 5, a policy storage is also depicted in each file system. Each file system may have its own policies, which, in some examples, may be implemented by a file server manager described herein. Policies may in some examples be communicated from the virtualized file server(s) to file server manager 510 for implementation by file server manager 510. The file server manager 510 may access metadata of the virtualized file servers to determine if a particular specified condition was met, and if so, may provide commands (e.g., calls) to the virtualized file server(s) to implement the policy—e.g., to scale up, scale down, backup, etc. Scaling up generally refers to adding one or more additional computing node(s) and/or FSVMs to a cluster of computing nodes used to implement the virtualized file server. Local storage devices of the added computing node may be added to the virtualized file server's storage pool, in some examples, and one or more file shares may be distributed across the storage pool, including the additional computing node. Scaling down generally refers to removing one or more computing node(s) and/or FSVMs from a cluster of computing nodes used to implement the virtualized file server. Local storage devices of the removed computing node may be removed from the virtualized file server's storage pool, and one or more file shares may be redistributed across the reduced storage pool.

In some examples, the file server managers described herein, such as file server manager 510 may implement cross-file server policies. For example, because file server manager 510 is in communication with multiple virtualized file servers—e.g., virtualized file server 514, virtualized file server 516, and virtualized file server 518, the file server manager 510 may implement a policy which impacts multiple virtualized file servers. For example, a policy may designate a source virtualized file server and a destination virtualized file server. For example, the file server manager 510 may designate virtualized file server 514 as a source virtualized file server and virtualized file server 516 as a destination virtualized file server. A cross-file server policy may specify that the destination virtualized file server be used to store redundant and/or backup data of the source virtualized file server. Accordingly, the file server manager 510 may communicate with virtualized file server 514 and virtualized file server 516 to implement the cross-file server policy and back-up and/or create redundant storage on virtualized file server 516 of all or portions of virtualized file server 514. In this manner, the virtualized file servers may not need to communicate directly with one another to implement a cross-file server policy. Instead, the file server manager 510 may centrally implement the cross-file server policy.

Moreover, file server managers described herein, such as file server manager 510 may present a view of one or more virtualized file servers—e.g., virtualized file server 514, virtualized file server 516, and virtualized file server 518. The view, based on metadata synchronized to a database of the file server manager 510 (e.g., as shown in database 306 of FIG. 3), may be used by one or more administrators to configure cross-file server policies. For example, an administrator may view current information about storage usage in the multiple virtualized file servers to select a source file server (e.g., a file server having less available storage than another) and a destination file server (e.g., a file server having more available storage than another, such as more available storage than the source file server). The administrator may accordingly configure a cross-file server policy based on the metadata to have the source file server back-up to the destination file server. In this manner, the file server manager 510 may provide a single pane of glass management interface for managing multiple virtualized file servers.

Figure 6:
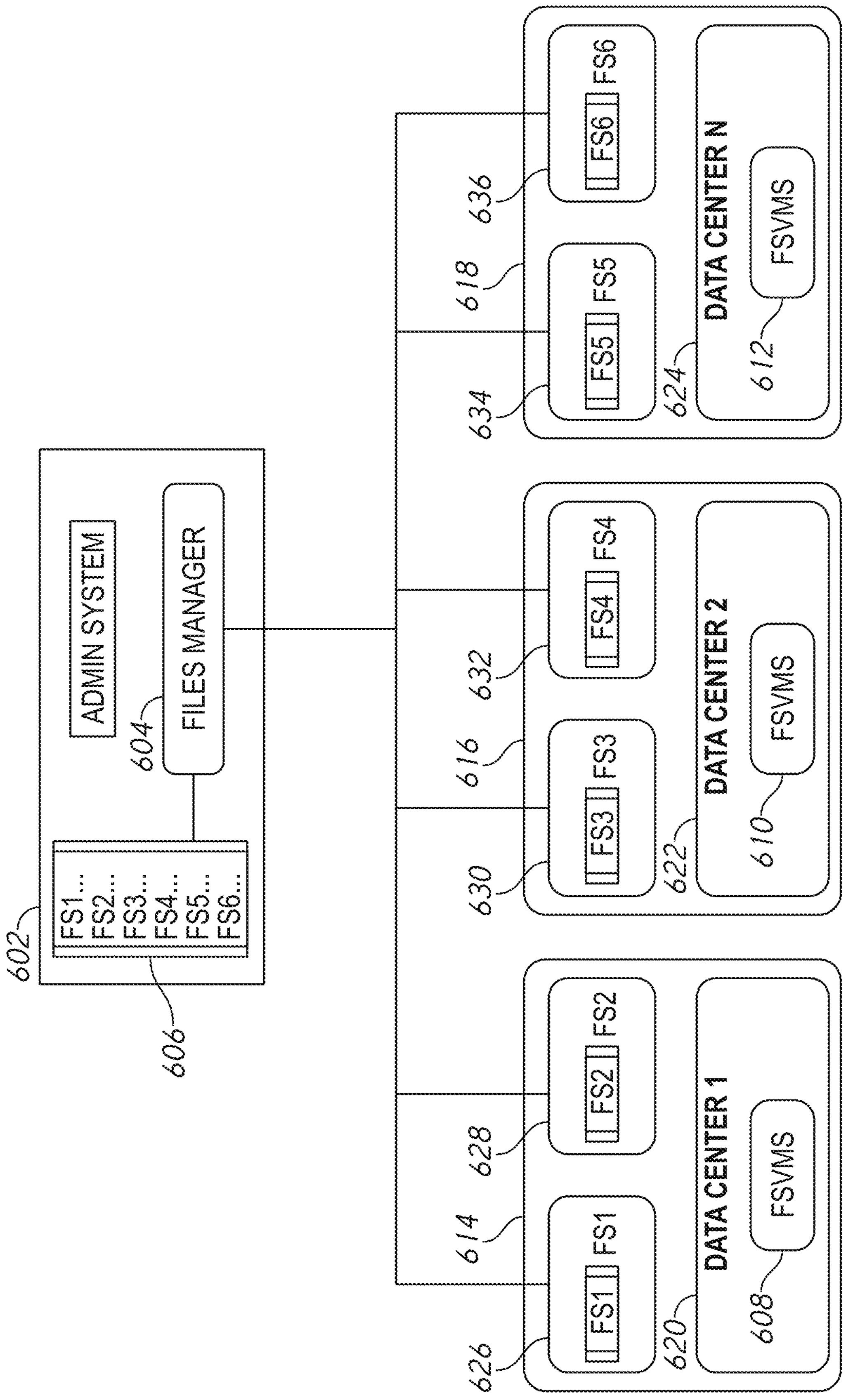
FIG. 6 is a schematic illustration of a system arranged in accordance with examples described herein.

FIG. 6 is a schematic illustration of a system arranged in accordance with examples described herein. The system of FIG. 6 includes an admin system 602 in communication with virtualized file server 614, virtualized file server 616, and virtualized file server 618. The virtualized file server 614 includes FSVMs 608 and is hosted on virtualization platform 620. The virtualized file server 616 provides file system 626 and file system 628. The virtualized file server 616 includes FSVMs 610 and is hosted on virtualization platform 622. The virtualized file server 616 provides file system 630 and file system 632. The virtualized file server 618 includes FSVMs 612 and is hosted on virtualization platform 624. The virtualized file server 618 provides file system 634 and file system 636. The admin system 602 includes file server manager 604 and user interfaces 606.

The components shown in FIG. 6 are exemplary only. Additional, fewer, and/or different components may be used in other examples.

In some examples, the system of FIG. 6 may be used to implement and/or may be implemented by the system of FIG. 1, the system of FIG. 3, the system of FIG. 5, or portions thereof. For example, the file server manager 604 may be implemented using file server manager 102 and/or file server manager 304 and/or file server manager 510. The virtualized file server 614, virtualized file server 616, virtualized file server 618 may be used to implement and/or may be implemented by virtualized file server 514, virtualized file server 516, and virtualized file server 518 of FIG. 5, and/or virtualized file server 334, virtualized file server 336, and virtualized file server 338 of FIG. 3 and/or virtualized file server 106, virtualized file server 114, and virtualized file server 122, respectively.

While three virtualized file servers are shown in FIG. 6, generally any number may be provided and may be in communication with file server manager 604. Each virtualized file server in FIG. 6 is shown as providing 2 file systems. However, generally, any number of file systems may be provided by a particular virtualization environment and/or virtualized file server-including 1, 2, 3, 4, 5, 6, 7, 8, 9, or more file systems.

The example of FIG. 6 illustrates a file server manager which may provide user interfaces to multiple virtualized file servers. The user interfaces 606 may include an interface to each of the file systems on virtualized file server 614, virtualized file server 616, and virtualized file server 618. For example, user interfaces 606 may include user interfaces to file system 626, file system 628, file system 630, file system 632, file system 634, and/or file system 636. Specifics of the file system's user interface may be provided to the file server manager 604 during registration and/or during metadata synchronization processes.

During operation, the file server manager 604 may present a view of multiple virtualized file servers to an administrator or other user. The view may be, for example, a display, a list, or other representation of the virtualized file servers in communication with the file server manager 604. A user may select or otherwise indicate a particular virtualized file server, and responsive to the selection, the file server manager 604 may display a user interface for the selected virtualized file server. The user interface for a selected virtualized file server may include a variety of selections and options specific to the virtualized file server. An administrator or other user may use the user interface specific to the virtualized file server, and commands or other selections received through the interface may be received by the file server manager 604 and communicated to the selected virtualized file server—e.g., as management requests formatted in accordance with the virtualization platform hosting the selected virtualized file server.

In this manner, the file server manager 604 may provide a centralized UI for a user to navigate to all connected file servers and to directly login through the file server manager 604 to the virtualized file server for more specific information if desired.

Accordingly, FIG. 3 has provided a depiction of a system where a file server manager may synchronize metadata with multiple virtualized file servers. FIG. 5 has provided depiction of a system where a file server manager may implement policies for multiple virtualized file servers, including cross-server policies. FIG. 6 has provided a depiction of a system where a file server manager may implement multiple user interfaces for virtualized file servers. It is to be understood that these various features may be combined—e.g., file server managers described herein may provide metadata synchronization, virtualized file server policy implementation, and/or multiple file server user interfaces.

In some examples, file server managers described herein may additionally or instead provide centralized life cycle management. File server managers may access information about software versions running on each of multiple virtualized file servers, including software versions of multiple components. The file server managers may provide software upgrades and/or software upgrade packages to multiple virtualized file servers, and may upgrade the multiple virtualized file servers in a manner which reduces or eliminates effects of dependences between the upgrades. For example, the virtualization environment on which each virtualized file server is hosted may place constraints on the pace or selection of upgrades. The central file server manager may be used to manage upgrades at a top level and resolve platform-based dependencies.

Examples of systems and methods described herein may include a file server manager in communication with one or more virtualized file servers. Examples of virtualized file servers which may be used to implement virtualized file servers are described in, for example, U.S. Published Patent Application 2017/0235760, entitled "Virtualized file server," published Aug. 17, 2017 on U.S. application Ser. No. 15/422,220, filed Feb. 1, 2017, both of which documents are hereby incorporated by reference in their entirety for any purpose.

Figure 7:
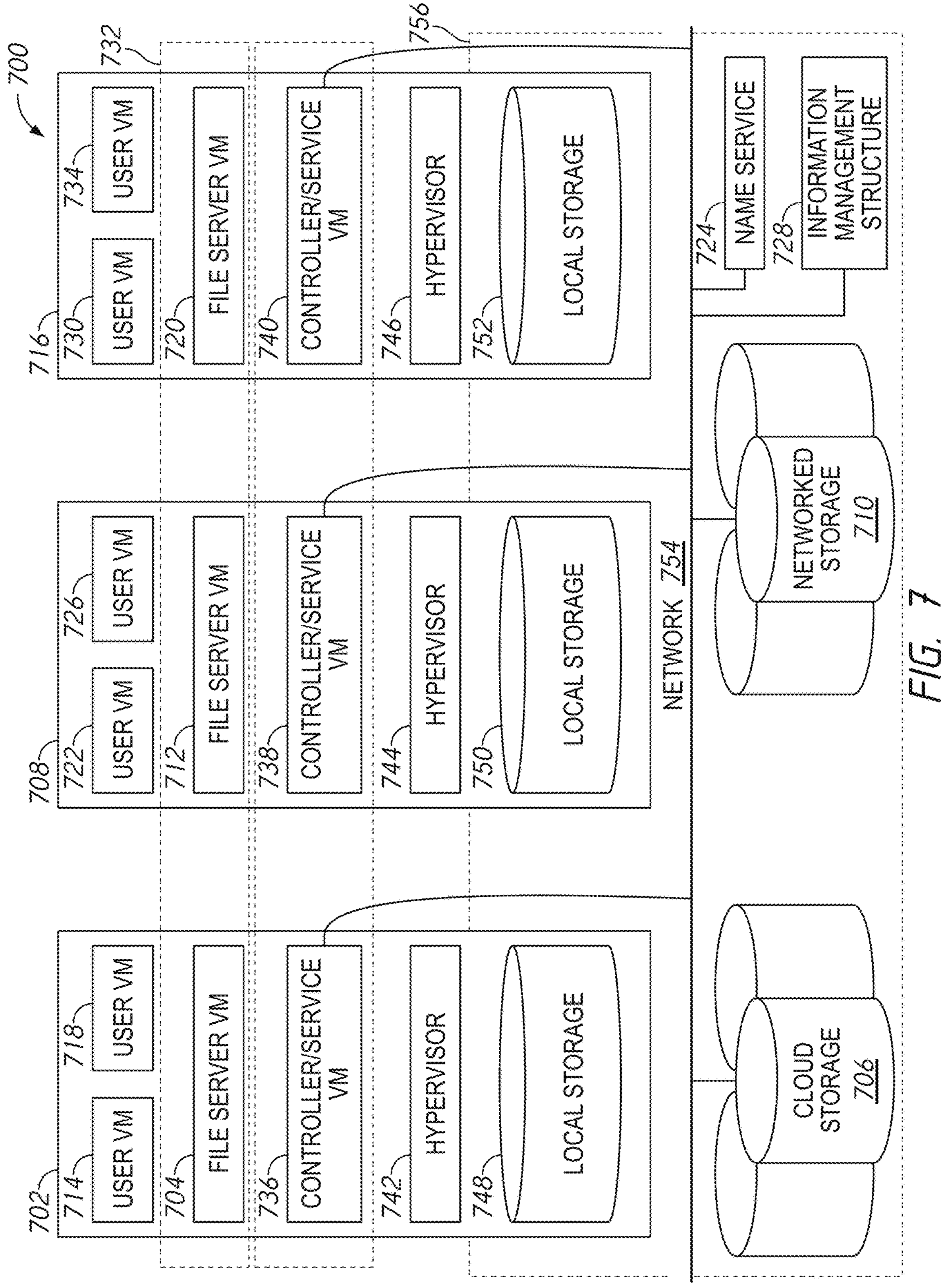
FIG. 7 is a schematic illustration of a clustered virtualization environment 700 implementing a virtualized file server in accordance with examples described herein.

FIG. 7 is a schematic illustration of a clustered virtualization environment 700 implementing a virtualized file server (VFS 732) according to particular embodiments. In particular embodiments, the VFS 732 provides file services to user VMs 714, 718, 722, 726, 730, and 734. Each user VM may be a client as used herein. The file services may include storing and retrieving data persistently, reliably, and efficiently. The user virtual machines may execute user processes, such as office applications or the like, on host machines 702, 708, and 716. The stored data may be represented as a set of storage items, such as files organized in a hierarchical structure of folders (also known as directories), which can contain files and other folders, and shares, which can also contain files and folders.

The clustered virtualization environment 700 and/or VFS 732 may be used to implement one or more virtualization platforms and/or virtualized file servers described herein, such as the virtualized file server 106, virtualized file server 114, and/or virtualized file server 122 of FIG. 1 and/or the virtualized file server 334, virtualized file server 336, and/or virtualized file server 338 of FIG. 3 and/or any other virtualized file server described herein.

The architectures of FIG. 7 can be implemented for a distributed platform that contains multiple host machines 702, 716, and 708 that manage multiple tiers of storage. The multiple tiers of storage may include storage that is accessible through network 754, such as, by way of example and not limitation, cloud storage 706 (e.g., which may be accessible through the Internet), network-attached storage 710 (NAS) (e.g., which may be accessible through a LAN), or a storage area network (SAN). Examples described herein also permit local storage 748, 750, and 752 that is incorporated into or directly attached to the host machine and/or appliance to be managed as part of storage pool 756. Examples of such local storage include Solid State Drives (henceforth "SSDs"), Hard Disk Drives (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 756. Virtual disks (or "vDisks") may be structured from the physical storage devices in storage pool 756. As used herein, the term vDisk refers to the storage abstraction that is exposed by a component of the virtualization platform, such as a Controller/Service VM (CVM) (e.g., CVM 736) and/or a hypervisor or other storage controller to be used by a user VM (e.g., user VM 714). In particular embodiments, the vDisk may be exposed via iSCSI ("internet small computer system interface") or NFS ("network filesystem") and is mounted as a virtual disk on the user VM. In particular embodiments, vDisks may be organized into one or more volume groups (VGs).

Each host machine 702, 716, 708 may run virtualization software, such as VMWARE ESX (I), MICROSOFT HYPER-V, or REDHAT KVM. The virtualization software includes hypervisors 742, 744, and 746 to create, manage, and destroy user VMs, as well as managing the interactions between the underlying hardware and user VMs. User VMs may run one or more applications that may operate as "clients" with respect to other elements within clustered virtualization environment 700. A hypervisor may connect to network 754. In particular embodiments, a host machine 702, 708, or 716 may be a physical hardware computing device; in particular embodiments, a host machine 702, 708, or 716 may be a virtual machine.

CVMs 736, 738, and 740 are used to manage storage and input/output ("I/O") activities according to particular embodiments. These special VMs act as the storage controller in the currently described architecture. Multiple such storage controllers may coordinate within a cluster to form a unified storage controller system. CVMs may run as virtual machines on the various host machines, and work together to form a distributed system that manages all the storage resources, including local storage, network-attached storage 710, and cloud storage 706. The CVMs may connect to network 754 directly, or via a hypervisor. Since the CVMs run independent of hypervisors 742, 744, 746, this means that the current approach can be used and implemented within any virtual machine architecture, since the CVMs of particular embodiments can be used in conjunction with any hypervisor from any virtualization vendor. In some examples, CVMs may not be used and one or more hypervisors (e.g., hypervisors 742, 744, and/or 746) may perform the functions described with respect to the CVMs. In some examples, one or more CVMs may not be present, and the hypervisor or other component hosted on the computing nodes may provide the functions attributed to the CVM herein.

A host machine may be designated as a leader node within a cluster of host machines. For example, host machine 708 may be a leader node. A leader node may have a software component designated to perform operations of the leader. For example, CVM 738 on host machine 708 may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node and/or in communication with the leader node or virtual machines or containers on the leader node. For example, file server managers described herein may be in communication with the leader node in some examples.

Each CVM 736, 738, and 740 exports one or more block devices or NFS server targets that appear as disks to user VMs 714, 718, 722, 726, 730, and 734. These disks are virtual, since they are implemented by the software running inside CVMs 736, 738, and 740. Thus, to user VMs, CVMs appear to be exporting a clustered storage appliance that contains some disks. All user data (including the operating system) in the user VMs may reside on these virtual disks.

Significant performance advantages can be gained by allowing the virtualization system to access and utilize local storage 748, 750, and 752 as disclosed herein. This is because I/O performance is typically much faster when performing access to local storage as compared to performing access to network-attached storage 710 across a network 754. This faster performance for locally attached storage can be increased even further by using certain types of optimized local storage devices, such as SSDs. Further details regarding methods and mechanisms for implementing the virtualization environment illustrated in FIG. 7 are described in U.S. Pat. No. 8,601,473, which is hereby incorporated by reference in its entirety.

As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 756. Additionally or alternatively, CVMs 736, 738, 740 may present an emulated storage controller either to the hypervisor or to user VMs to facilitate I/O operations. CVMs 736, 738, and 740 may be connected to storage within storage pool 756. CVM 736 may have the ability to perform I/O operations using local storage 748 within the same host machine 702, by connecting via network 754 to cloud storage 706 or network-attached storage 710, or by connecting via network 754 to local storage 750 or 752 within another host machine 708 or 716 (e.g., via connecting to another CVM 738 or 740). In particular embodiments, any suitable computing system may be used to implement a host machine.

In particular embodiments, the VFS 732 may include a set of File Server Virtual Machines (FSVMs) 704, 712, and 720 that execute on host machines 702, 708, and 716 and process storage item access operations requested by user VMs executing on the host machines 702, 708, and 716. The FSVMs 704, 712, and 720 may communicate with storage controllers provided by CVMs 736, 744, 740 and/or hypervisors executing on the host machines 702, 708, 716 to store and retrieve files, folders, SMB shares, or other storage items on local storage 748, 750, 752 associated with, e.g., local to, the host machines 702, 708, 716. The FSVMs 704, 712, 720 may store and retrieve block-level data on the host machines 702, 708, 716, e.g., on the local storage 748, 750, 752 of the host machines 702, 708, 716. The block-level data may include block-level representations of the storage items (e.g., files, shares). The network protocol used for communication between user VMs, FSVMs, and CVMs via the network 754 may be Internet Small Computer Systems Interface (iSCSI), Server Message Block (SMB), Network Filesystem (NFS), pNFS (Parallel NFS), or another appropriate protocol.

For the purposes of VFS 732, host machine 716 may be designated as a leader node within a cluster of host machines. In this case, FSVM 720 on host machine 716 may be designated to perform such operations. A leader may be responsible for monitoring or handling requests from FSVMs on other host machines throughout the virtualized environment. If FSVM 720 fails, a new leader may be designated for VFS 732.

In particular embodiments, the user VMs may send data to the VFS 732 (e.g., to the FSVMs) using write requests, and may receive data from it using read requests. The read and write requests, and their associated parameters, data, and results, may be sent between a user VM and one or more file server VMs (FSVMs) located on the same host machine as the user VM or on different host machines from the user VM. The read and write requests may be sent between host machines 702, 708, 716 via network 754, e.g., using a network communication protocol such as iSCSI, CIFS, SMB, TCP, IP, or the like. When a read or write request is sent between two VMs located on the same one of the host machines 702, 708, 716 (e.g., between the user VM 714 and the FSVM 704 located on the host machine 702), the request may be sent using local communication within the host machine 702 instead of via the network 754. As described above, such local communication may be substantially faster than communication via the network 754. The local communication may be performed by, e.g., writing to and reading from shared memory accessible by the user VM 714 and the FSVM 704, sending and receiving data via a local "loopback" network interface, local stream communication, or the like.

In particular embodiments, the storage items stored by the VFS 732, such as files and folders, may be distributed amongst multiple FSVMs 704, 712, 720. In particular embodiments, when storage access requests are received from the user VMs, the VFS 732 identifies FSVMs 704, 712, 720 at which requested storage items, e.g., folders, files, or portions thereof, are stored, and directs the user VMs to the locations of the storage items. The FSVMs 704, 712, 720 may maintain a storage map, such as a sharding map, that maps names or identifiers of storage items to their corresponding locations. The storage map may be a distributed data structure of which copies are maintained at each FSVM 704, 712, 720 and accessed using distributed locks or other storage item access operations. Alternatively, the storage map may be maintained by an FSVM at a leader node such as the FSVM 720, and the other FSVMs 704 and 712 may send requests to query and update the storage map to the leader FSVM 720. Other implementations of the storage map are possible using appropriate techniques to provide asynchronous data access to a shared resource by multiple readers and writers. The storage map may map names or identifiers of storage items in the form of text strings or numeric identifiers, such as folder names, files names, and/or identifiers of portions of folders or files (e.g., numeric start offset positions and counts in bytes or other units) to locations of the files, folders, or portions thereof. Locations may be represented as names of FSVMs, e.g., "FSVM-1", as network addresses of host machines on which FSVMs are located (e.g., "ip-addr1" or 128.1.1.10), or as other types of location identifiers.

When a user application executing in a user VM 714 on one of the host machines 702 initiates a storage access operation, such as reading or writing data, the user VM 714 may send the storage access operation in a request to one of the FSVMs 704, 712, 720 on one of the host machines 702, 708, 716. A FSVM 712 executing on a host machine 708 that receives a storage access request may use the storage map to determine whether the requested file or folder is located on the FSVM 712. If the requested file or folder is located on the FSVM 712, the FSVM 712 executes the requested storage access operation. Otherwise, the FSVM 712 responds to the request with an indication that the data is not on the FSVM 712, and may redirect the requesting user VM 714 to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM 704 by sending a file service operation that creates the file or folder to a CVM 736 and/or hypervisor 742 associated with (e.g., located on the same host machine as) the FSVM 704. The CVM 736 subsequently processes file service commands for that file for the FSVM 704 and sends corresponding storage access operations to storage devices associated with the file. The CVM 736 may associate local storage 748 with the file if there is sufficient free space on local storage 748. Alternatively, the CVM 736 may associate a storage device located on another host machine 702, e.g., in local storage 750, with the file under certain conditions, e.g., if there is insufficient free space on the local storage 748, or if storage access operations between the CVM 736 and the file are expected to be infrequent. Files and folders, or portions thereof, may also be stored on other storage devices, such as the network-attached storage (NAS) network-attached storage 710 or the cloud storage 706 of the storage pool 756.

In particular embodiments, a name service 724, such as that specified by the Domain Name System (DNS) Internet protocol, may communicate with the host machines 702, 708, 716 via the network 754 and may store a database of domain name (e.g., host name) to IP address mappings. The domain names may correspond to FSVMs, e.g., fsvm1.domain.com or ip-addr1.domain.com for an FSVM named FSVM-1. The name service 724 may be queried by the user VMs to determine the IP address of a particular host machine 702, 708, 716 given a name of the host machine, e.g., to determine the IP address of the host name ip-addr1 for the host machine 702. The name service 724 may be located on a separate server computer system or on one or more of the host machines 702, 708, 716. The names and IP addresses of the host machines of the VFS 732, e.g., the host machines 702, 708, 716, may be stored in the name service 724 so that the user VMs may determine the IP address of each of the host machines 702, 708, 716, or FSVMs 704, 712, 720. The name of each VFS instance, e.g., each file system such as FS1, FS2, or the like, may be stored in the name service 724 in association with a set of one or more names that contains the name(s) of the host machines 702, 708, 716 or FSVMs 704, 712, 720 of the VFS instance VFS 732. The FSVMs 704, 712, 720 may be associated with the host names ip-addr1, ip-addr2, and ip-addr3, respectively. For example, the file server instance name FS1.domain.com may be associated with the host names ip-addr1, ip-addr2, and ip-addr3 in the name service 724, so that a query of the name service 724 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 724 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs may be balanced across the host machines, since the user VMs submit requests to the name service 724 for the address of the VFS instance for storage items for which the user VMs do not have a record or cache entry, as described below.

In particular embodiments, each FSVM may have two IP addresses: an external IP address and an internal IP address. The external IP addresses may be used by SMB/CIFS clients, such as user VMs, to connect to the FSVMs. The external IP addresses may be stored in the name service 724. The IP addresses ip-addr1, ip-addr2, and ip-addr3 described above are examples of external IP addresses. The internal IP addresses may be used for iSCSI communication to CVMs and/or hypervisors, e.g., between the FSVMs 704, 712, 720 and the CVMs 736, 744, 740 and/or hypervisors 742, 744, and/or 746. Other internal communications may be sent via the internal IP addresses as well, e.g., file server configuration information may be sent from the CVMs to the FSVMs using the internal IP addresses, and the CVMs may get file server statistics from the FSVMs via internal communication as needed.

Since the VFS 732 is provided by a distributed set of FSVMs 704, 712, 720, the user VMs that access particular requested storage items, such as files or folders, do not necessarily know the locations of the requested storage items when the request is received. A distributed file system protocol, e.g., MICROSOFT DFS or the like, is therefore used, in which a user VM 714 may request the addresses of FSVMs 704, 712, 720 from a name service 724 (e.g., DNS). The name service 724 may send one or more network addresses of FSVMs 704, 712, 720 to the user VM 714, in an order that changes for each subsequent request. These network addresses are not necessarily the addresses of the FSVM 712 on which the storage item requested by the user VM 714 is located, since the name service 724 does not necessarily have information about the mapping between storage items and FSVMs 704, 712, 720. Next, the user VM 714 may send an access request to one of the network addresses provided by the name service, e.g., the address of FSVM 712. The FSVM 712 may receive the access request and determine whether the storage item identified by the request is located on the FSVM 712. If so, the FSVM 712 may process the request and send the results to the requesting user VM 714. However, if the identified storage item is located on a different FSVM 720, then the FSVM 712 may redirect the user VM 714 to the FSVM 720 on which the requested storage item is located by sending a "redirect" response referencing FSVM 720 to the user VM 714. The user VM 714 may then send the access request to FSVM 720, which may perform the requested operation for the identified storage item.

A particular virtualized file server, such as VFS 732, including the items it stores, e.g., files and folders, may be referred to herein as a VFS "instance" and/or a file system and may have an associated name, e.g., FS1, as described above. Although a VFS instance may have multiple FSVMs distributed across different host machines, with different files being stored on FSVMs, the VFS instance may present a single name space to its clients such as the user VMs. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs may access the data stored on a distributed VFS instance via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients such as user VMs by name, e.g., "\Folder-1\File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance by specifying the file names or path names, e.g., the path name "\Folder-1\File-1", in storage access operations. If the storage items are stored on a share (e.g., a shared drive), then the share name may be used to access the storage items, e.g., via the path name "\\Share-1\Folder-1\File-1" to access File-1 in folder Folder-1 on a share named Share-1.

In particular embodiments, although the VFS instance may store different folders, files, or portions thereof at different locations, e.g., on different FSVMs, the use of different FSVMs or other elements of storage pool 756 to store the folders and files may be hidden from the accessing clients. The share name is not necessarily a name of a location such as an FSVM or host machine. For example, the name Share-1 does not identify a particular FSVM on which storage items of the share are located. The share Share-1 may have portions of storage items stored on three host machines, but a user may simply access Share-1, e.g., by mapping Share-1 to a client computer, to gain access to the storage items on Share-1 as if they were located on the client computer. Names of storage items, such as file names and folder names, are similarly location-independent. Thus, although storage items, such as files and their containing folders and shares, may be stored at different locations, such as different host machines, the files may be accessed in a location-transparent manner by clients (such as the user VMs). Thus, users at client systems need not specify or know the locations of each storage item being accessed. The VFS may automatically map the file names, folder names, or full path names to the locations at which the storage items are stored. As an example and not by way of limitation, a storage item's location may be specified by the name, address, or identity of the FSVM that provides access to the storage item on the host machine on which the storage item is located. A storage item such as a file may be divided into multiple parts that may be located on different FSVMs, in which case access requests for a particular portion of the file may be automatically mapped to the location of the portion of the file based on the portion of the file being accessed (e.g., the offset from the beginning of the file and the number of bytes being accessed).

In particular embodiments, VFS 732 determines the location, e.g., FSVM, at which to store a storage item when the storage item is created. For example, a FSVM 704 may attempt to create a file or folder using a CVM 736 on the same host machine 702 as the user VM 718 that requested creation of the file, so that the CVM 736 that controls access operations to the file folder is co-located with the user VM 718. In this way, since the user VM 718 is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM on the same host machine as the FSVM, the FSVM may identify it and use it by default. If there is no local CVM on the same host machine as the FSVM, a delay may be incurred for communication between the FSVM and a CVM on a different host machine. Further, the VFS 732 may also attempt to store the file on a storage device that is local to the CVM being used to create the file, such as local storage, so that storage access operations between the CVM and local storage may use local or short-distance communication.

In particular embodiments, if a CVM is unable to store the storage item in local storage of a host machine on which an FSVM resides, e.g., because local storage does not have sufficient available free space, then the file may be stored in local storage of a different host machine. In this case, the stored file is not physically local to the host machine, but storage access operations for the file are performed by the locally-associated CVM and FSVM, and the CVM may communicate with local storage on the remote host machine using a network file sharing protocol, e.g., iSCSI, SAMBA, or the like.

In particular embodiments, if a virtual machine, such as a user VM 714, CVM 736, or FSVM 704, moves from a host machine 702 to a destination host machine 708, e.g., because of resource availability changes, and data items such as files or folders associated with the VM are not locally accessible on the destination host machine 708, then data migration may be performed for the data items associated with the moved VM to migrate them to the new host machine 708, so that they are local to the moved VM on the new host machine 708. FSVMs may detect removal and addition of CVMs (as may occur, for example, when a CVM fails or is shut down) via the iSCSI protocol or other technique, such as heartbeat messages. As another example, a FSVM may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 732 may change the location of the file by, for example, copying the file from its existing location (s), such as local storage 748 of a host machine 702, to its new location(s), such as local storage 750 of host machine 708 (and to or from other host machines, such as local storage 752 of host machine 716 if appropriate), and deleting the file from its existing location(s). Write operations on the file may be blocked or queued while the file is being copied, so that the copy is consistent. The VFS 732 may also redirect storage access requests for the file from an FSVM at the file's existing location to a FSVM at the file's new location.

In particular embodiments, VFS 732 includes at least three File Server Virtual Machines (FSVMs) 704, 712, 720 located on three respective host machines 702, 708, 716. To provide high-availability, there may be a maximum of one FSVM for a particular VFS instance VFS 732 per host machine in a cluster. If two FSVMs are detected on a single host machine, then one of the FSVMs may be moved to another host machine automatically, or the user (e.g., system administrator and/or file server manager) may be notified to move the FSVM to another host machine. The user and/or file server manager may move a FSVM to another host machine using an administrative interface that provides commands for starting, stopping, and moving FSVMs between host machines.

In particular embodiments, two FSVMs of different VFS instances may reside on the same host machine. If the host machine fails, the FSVMs on the host machine become unavailable, at least until the host machine recovers. Thus, if there is at most one FSVM for each VFS instance on each host machine, then at most one of the FSVMs may be lost per VFS per failed host machine. As an example, if more than one FSVM for a particular VFS instance were to reside on a host machine, and the VFS instance includes three host machines and three FSVMs, then loss of one host machine would result in loss of two-thirds of the FSVMs for the VFS instance, which would be more disruptive and more difficult to recover from than loss of one-third of the FSVMs for the VFS instance.

In particular embodiments, users, such as system administrators or other users of the user VMs, may expand the cluster of FSVMs by adding additional FSVMs. Each FSVM may be associated with at least one network address, such as an IP (Internet Protocol) address of the host machine on which the FSVM resides. There may be multiple clusters, and all FSVMs of a particular VFS instance are ordinarily in the same cluster. The VFS instance may be a member of a MICROSOFT ACTIVE DIRECTORY domain, which may provide authentication and other services such as name service.

Figure 8:
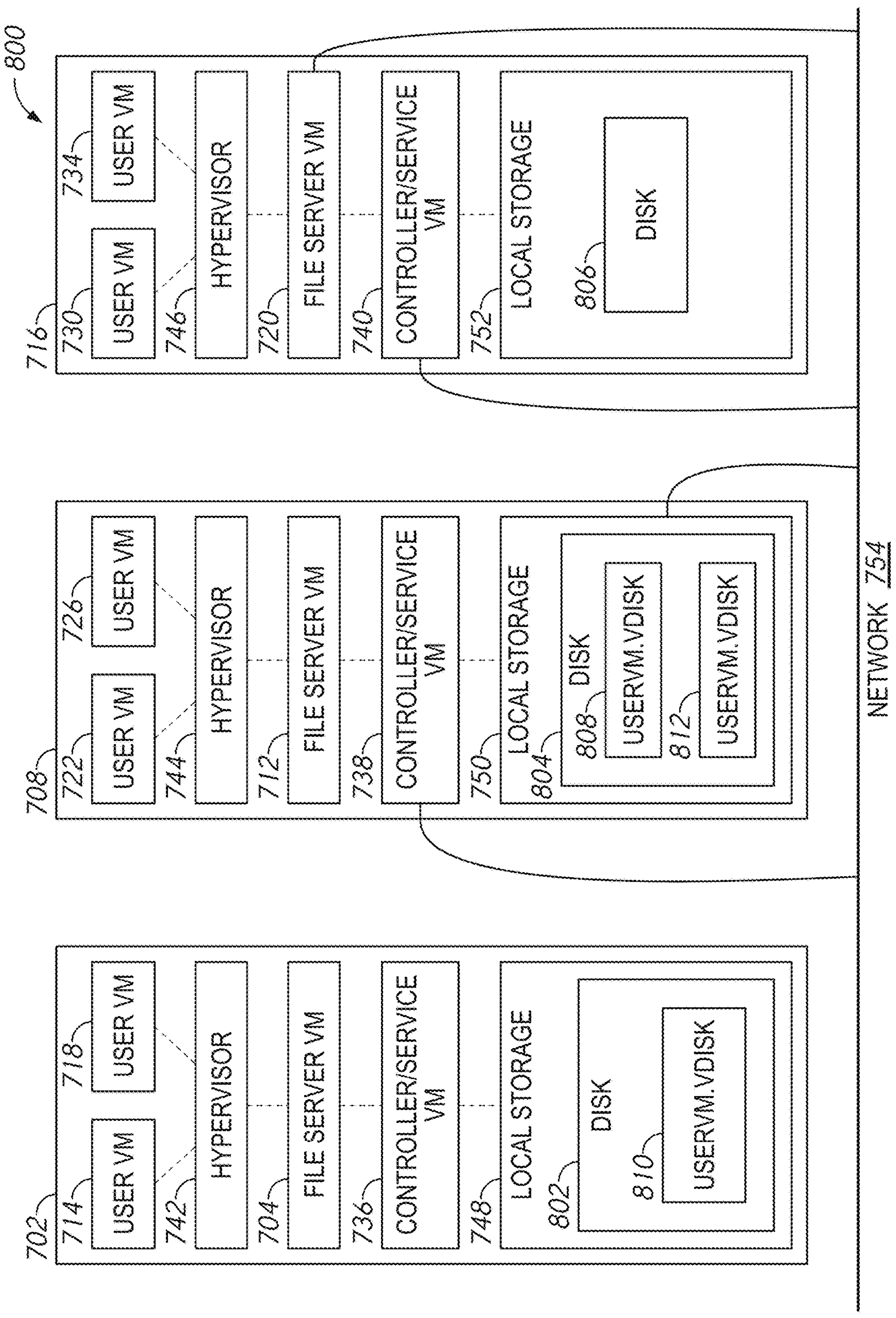
FIG. 8 is a schematic illustration of a clustered virtualization environment 800 arranged in accordance with examples described herein.

FIG. 8 illustrates data flow within a clustered virtualization environment 800 implementing a VFS instance (e.g., VFS 732) in which stored items such as files and folders used by user VMs are stored locally on the same host machines as the user VMs according to particular embodiments. As described above, one or more user VMs and a Controller/Service VM and/or hypervisor may run on each host machine along with a hypervisor. As a user VM processes I/O commands (e.g., a read or write operation), the I/O commands may be sent to the hypervisor on the same server or host machine as the user VM. For example, the hypervisor may present to the user VMs a VFS instance, receive an I/O command, and facilitate the performance of the I/O command by passing the command to a FSVM that performs the operation specified by the command. The VFS may facilitate I/O operations between a user VM and a virtualized file system. The virtualized file system may appear to the user VM as a namespace of mappable shared drives or mountable network file systems of files and directories. The namespace of the virtualized file system may be implemented using storage devices in the local storage, such as disks, onto which the shared drives or network file systems, files, and folders, or portions thereof, may be distributed as determined by the FSVMs. The VFS may thus provide features disclosed herein, such as efficient use of the disks, high availability, scalability, and others. The implementation of these features may be transparent to the user VMs. The FSVMs may present the storage capacity of the disks of the host machines as an efficient, highly-available, and scalable namespace in which the user VMs may create and access shares, files, folders, and the like.

As an example, a network share may be presented to a user VM as one or more discrete virtual disks, but each virtual disk may correspond to any part of one or more virtual or physical disks within a storage pool. Additionally or alternatively, the FSVMs may present a VFS either to the hypervisor or to user VMs of a host machine to facilitate I/O operations. The FSVMs may access the local storage via Controller/Service VMs, other storage controllers, hypervisors, or other components of the host machine. As described herein, a CVM 736 may have the ability to perform I/O operations using local storage 748 within the same host machine 702 by connecting via the network 754 to cloud storage or NAS, or by connecting via the network 754 to 750, 752 within another host machine 708, 716 (e.g., by connecting to another CVM 738, 740).

In particular embodiments, each user VM may access one or more virtual disk images stored on one or more disks of the local storage, the cloud storage, and/or the NAS. The virtual disk images may contain data used by the user VMs, such as operating system images, application software, and user data, e.g., user home folders and user profile folders. For example, FIG. 8 illustrates three virtual machine images 810, 808, 812. The virtual machine image 810 may be a file named UserVM.vmdisk (or the like) stored on disk 802 of local storage 748 of host machine 702. The virtual machine image 810 may store the contents of the user VM 714's hard drive. The disk 802 on which the virtual machine image 810 is "local to" the user VM 714 on host machine 702 because the disk 802 is in local storage 748 of the host machine 702 on which the user VM 714 is located. Thus, the user VM 714 may use local (intra-host machine) communication to access the virtual machine image 810 more efficiently, e.g., with less latency and higher throughput, than would be the case if the virtual machine image 810 were stored on disk 804 of local storage 750 of a different host machine 708, because inter-host machine communication across the network 754 would be used in the latter case. Similarly, a virtual machine image 808, which may be a file named UserVM.vmdisk (or the like), is stored on disk 804 of local storage 750 of host machine 708, and the image 808 is local to the user VM 722 located on host machine 708. Thus, the user VM 722 may access the virtual machine image 808 more efficiently than the virtual machine 718 on host machine 702, for example. In another example, the CVM 740 may be located on the same host machine 716 as the user VM 730 that accesses a virtual machine image 812 (UserVM.vmdisk) of the user VM 730, with the virtual machine image file 812 being stored on a different host machine 708 than the user VM 730 and the CVM 740. In this example, communication between the user VM 730 and the CVM 740 may still be local, e.g., more efficient than communication between the user VM 730 and a CVM 738 on a different host machine 708, but communication between the CVM 740 and the disk 804 on which the virtual machine image 812 is stored is via the network 754, as shown by the dashed lines between CVM 740 and the network 754 and between the network 754 and local storage 750. The communication between CVM 740 and the disk 804 is not local, and thus may be less efficient than local communication such as may occur between the CVM 740 and a disk 806 in local storage 752 of host machine 716. Further, a user VM 730 on host machine 716 may access data such as the virtual disk image 812 stored on a remote (e.g., non-local) disk 804 via network communication with a CVM 738 located on the remote host machine 708. This case may occur if CVM 740 is not present on host machine 716, e.g., because CVM 740 has failed, or if the FSVM 720 has been configured to communicate with 750 on host machine 708 via the CVM 738 on host machine 708, e.g., to reduce computational load on host machine 716.

In particular embodiments, since local communication is expected to be more efficient than remote communication, the FSVMs may store storage items, such as files or folders, e.g., the virtual disk images, as block-level data on local storage of the host machine on which the user VM that is expected to access the files is located. A user VM may be expected to access particular storage items if, for example, the storage items are associated with the user VM, such as by configuration information. For example, the virtual disk image 810 may be associated with the user VM 714 by configuration information of the user VM 714. Storage items may also be associated with a user VM via the identity of a user of the user VM. For example, files and folders owned by the same user ID as the user who is logged into the user VM 714 may be associated with the user VM 714. If the storage items expected to be accessed by a user VM 714 are not stored on the same host machine 702 as the user VM 714, e.g., because of insufficient available storage capacity in local storage 748 of the host machine 702, or because the storage items are expected to be accessed to a greater degree (e.g., more frequently or by more users) by a user VM 722 on a different host machine 708, then the user VM 714 may still communicate with a local CVM 736 to access the storage items located on the remote host machine 708, and the local CVM 736 may communicate with local storage 750 on the remote host machine 708 to access the storage items located on the remote host machine 708. If the user VM 714 on a host machine 702 does not or cannot use a local CVM 736 to access the storage items located on the remote host machine 708, e.g., because the local CVM 736 has crashed or the user VM 714 has been configured to use a remote CVM 738, then communication between the user VM 714 and local storage 750 on which the storage items are stored may be via a remote CVM 738 using the network 754, and the remote CVM 738 may access local storage 750 using local communication on host machine 708. As another example, a user VM 714 on a host machine 702 may access storage items located on a disk 806 of local storage 752 on another host machine 716 via a CVM 738 on an intermediary host machine 708 using network communication between the host machines 702 and 708 and between the host machines 708 and 716.

Figure 9:
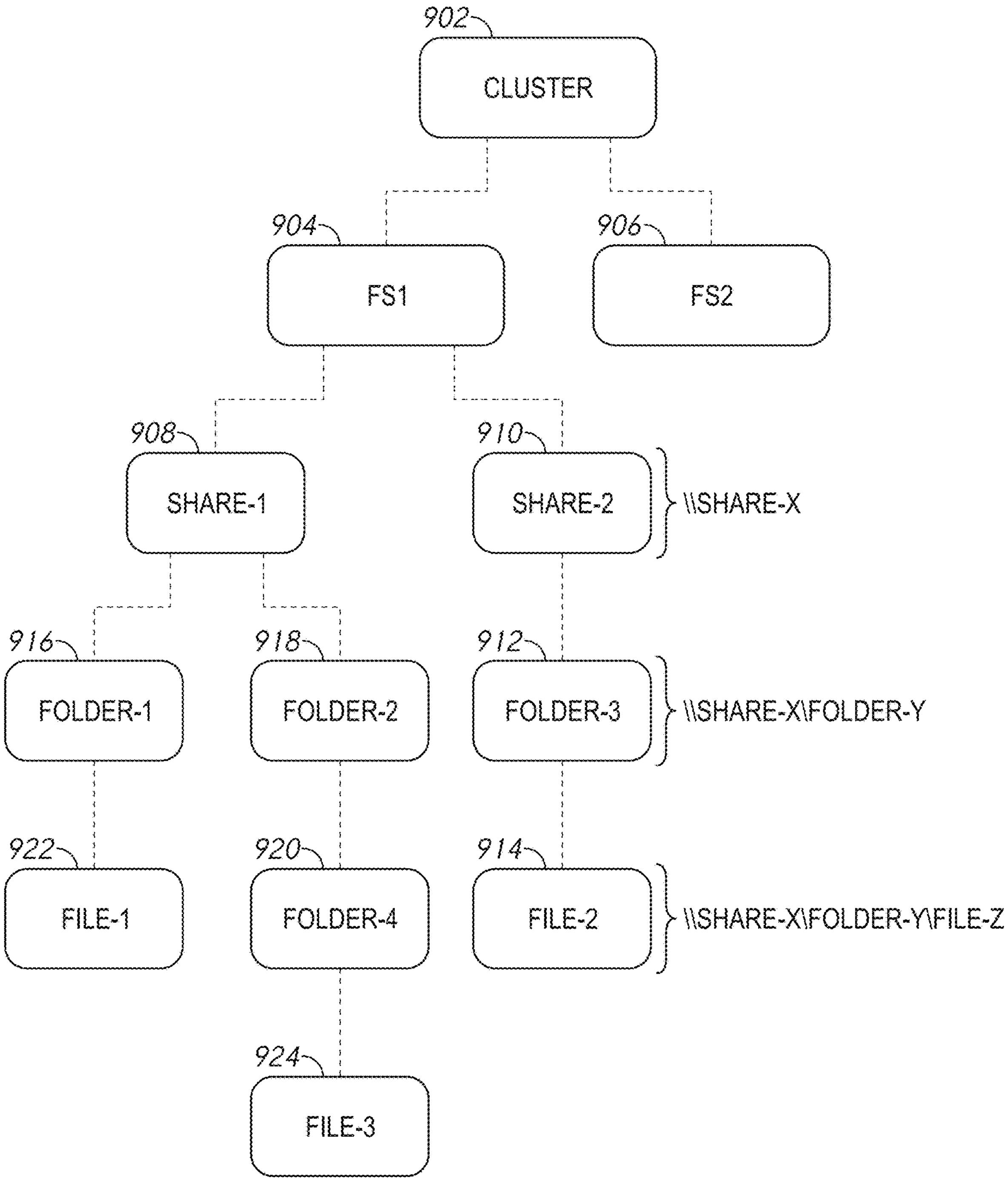
FIG. 9 illustrates an example hierarchical structure of a VFS instance in a cluster according to particular embodiments.

FIG. 9 illustrates an example hierarchical structure of a VFS instance (e.g., a file system) in a cluster (such as a virtualized file server) according to particular embodiments. A Cluster 902 contains two VFS instances, FS1 904 and FS2 906. For example, the 902 may be used to implement and/or may be implemented by a virtualized file server described herein, such as virtualized file server 334, virtualized file server 336, and/or virtualized file server 338 of FIG. 3. Each VFS instance as shown in FIG. 9 may be identified by a name such as "\\instance", e.g., "\\FS1" for WINDOWS file systems, or a name such as "instance", e.g., "FS1" for UNIX-type file systems. The VFS instance FS1 904 contains shares, including Share-1 908 and Share-2 910. Shares may have names such as "Users" for a share that stores user home directories, or the like. Each share may have a path name such as \\FS1\Share-1 or \\FS1\Users. As an example and not by way of limitation, a share may correspond to a disk partition or a pool of file system blocks on WINDOWS and UNIX-type file systems. As another example and not by way of limitation, a share may correspond to a folder or directory on a VFS instance. Shares may appear in the file system instance as folders or directories to users of user VMs. Share-1 908 includes two folders, Folder-1 916, and Folder-2 918, and may also include one or more files (e.g., files not in folders). Each folder 916, 918 may include one or more files 922, 924. Share-2 910 includes a folder Folder-3 912, which includes a file File-2 914. Each folder has a folder name such as "Folder-1", "Users", or "Sam" and a path name such as "\\FS1\Share-1\Folder-1" (WINDOWS) or "share-1:/fs1/Users/Sam" (UNIX). Similarly, each file has a file name such as "File-1" or "Forecast.xls" and a path name such as "\\FS1\Share-1\Folder-1\File-1" or "share-1:/fs1/Users/Sam/Forecast.xls".

Figure 10:
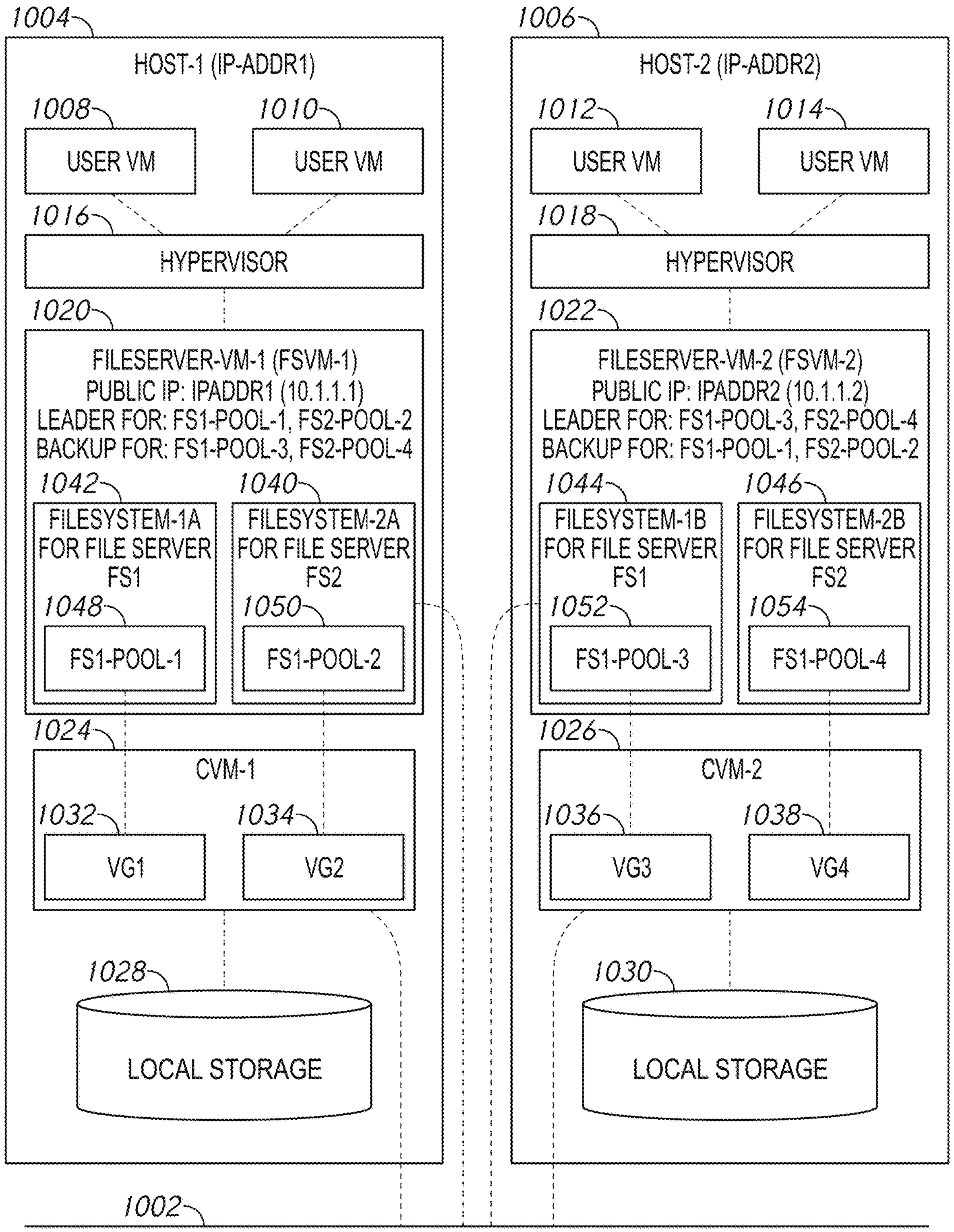
FIG. 10 illustrates two example host machines, each providing file storage services for portions of two VFS instances FS1 and FS2 according to particular embodiments.

FIG. 10 illustrates two example host machines 1004 and 1006, each providing file storage services for portions of two VFS instances FS1 and FS2 according to particular embodiments. The first host machine, Host-1 702, includes two user VMs 1008, 1010, a Hypervisor 1016, a FSVM named FileServer-VM-1 (abbreviated FSVM-1) 1020, a Controller/Service VM named CVM-1 1024, and local storage 1028. Host-1's FileServer-VM-1 1020 has an IP (Internet Protocol) network address of 10.1.1.1, which is an address of a network interface on Host-1 1004. Host-1 has a hostname ip-addr1, which may correspond to Host-1's IP address 10.1.1.1. The second host machine, Host-2 1006, includes two user VMs 1012, 1014, a Hypervisor 1018, a File Server VM named FileServer-VM-2 (abbreviated FSVM-2) 1022, a Controller/Service VM named CVM-2 1026, and local storage 1030. Host-2's FileServer-VM-2 1022 has an IP network address of 10.1.1.2, which is an address of a network interface on Host-2 1006.

In particular embodiments, file systems FileSystem-1A 1042 and FileSystem-2A 1040 implement the structure of files and folders for portions of the FS1 and FS2 file server instances, respectively, that are located on (e.g., served by) FileServer-VM-1 1020 on Host-1 1004. Other file systems on other host machines may implement other portions of the FS1 and FS2 file server instances. The file systems 1042 and 1040 may implement the structure of at least a portion of a file server instance by translating file system operations, such as opening a file, writing data to or reading data from the file, deleting a file, and so on, to disk I/O operations such as seeking to a portion of the disk, reading or writing an index of file information, writing data to or reading data from blocks of the disk, allocating or de-allocating the blocks, and so on. The file systems 1042, 1040 may thus store their file system data, including the structure of the folder and file hierarchy, the names of the storage items (e.g., folders and files), and the contents of the storage items on one or more storage devices, such as local storage 1028. The particular storage device or devices on which the file system data for each file system are stored may be specified by an associated file system pool (e.g., 1048 and 1050). For example, the storage device(s) on which data for FileSystem-1A 1042 and FileSystem-2A, 1040 are stored may be specified by respective file system pools FS1-Pool-1 1048 and FS2-Pool-2 1050. The storage devices for the pool may be selected from volume groups provided by CVM-1 1024, such as volume group VG1 1032 and volume group VG2 1034. Each volume group 1032, 1034 may include a group of one or more available storage devices that are present in local storage 1028 associated with (e.g., by iSCSI communication) the CVM-1 1024. The CVM-1 1024 may be associated with a local storage 1028 on the same host machine 702 as the CVM-1 1024, or with a local storage 1030 on a different host machine 1006. The CVM-1 1024 may also be associated with other types of storage, such as cloud storage, networked storage or the like. Although the examples described herein include particular host machines, virtual machines, file servers, file server instances, file server pools, CVMs, volume groups, and associations there between, any number of host machines, virtual machines, file servers, file server instances, file server pools, CVMs, volume groups, and any associations there between are possible and contemplated.

In particular embodiments, the file system pool 1048 may associate any storage device in one of the volume groups 1032, 1034 of storage devices that are available in local storage 1028 with the file system FileSystem-1A 1042. For example, the file system pool FS1-Pool-1 1048 may specify that a disk device named hd1 in the volume group VG1 1032 of local storage 1028 is a storage device for FileSystem-1A 1042 for file server FS1 on FSVM-1 1020. A file system pool FS2-Pool-2 1050 may specify a storage device FileSystem-2A 1050 for file server FS2 on FSVM-1 1020. The storage device for FileSystem-2A 1040 may be, e.g., the disk device hd1, or a different device in one of the volume groups 1032, 1034, such as a disk device named hd2 in volume group VG2 1034. Each of the file systems FileSystem-1A 1042, FileSystem-2A 1040 may be, e.g., an instance of the NTFS file system used by the WINDOWS operating system, of the UFS Unix file system, or the like. The term "file system" may also be used herein to refer to an instance of a type of file system, e.g., a particular structure of folders and files with particular names and content.

In one example, referring to FIG. 9 and FIG. 10, an FS1 hierarchy rooted at File Server FS1 904 may be located on FileServer-VM-1 1020 and stored in file system instance FileSystem-1A 1042. That is, the file system instance FileSystem-1A 1042 may store the names of the shares and storage items (such as folders and files), as well as the contents of the storage items, shown in the hierarchy at and below File Server FS1 904. A portion of the FS1 hierarchy shown in FIG. 9, such the portion rooted at Folder-2 918, may be located on FileServer-VM-2 1022 on Host-2 1006 instead of FileServer-VM-1 1020, in which case the file system instance FileSystem-1B 1044 may store the portion of the FS1 hierarchy rooted at Folder-2 918, including Folder-3 912, Folder-4 920 and File-3 924. Similarly, an FS2 hierarchy rooted at File Server FS2 906 in FIG. 9 may be located on FileServer-VM-1 1020 and stored in file system instance FileSystem-2A 1040. The FS2 hierarchy may be split into multiple portions (not shown), such that one portion is located on FileServer-VM-1 1020 on Host-1 1004, and another portion is located on FileServer-VM-2 1022 on Host-2 1006 and stored in file system instance FileSystem-2B 1046.

In particular embodiments, FileServer-VM-1 (abbreviated FSVM-1) 1020 on Host-1 1004 is a leader for a portion of file server instance FS1 and a portion of FS2, and is a backup for another portion of FS1 and another portion of FS2. The portion of FS1 for which FileServer-VM-1 1020 is a leader corresponds to a storage pool labeled FS1-Pool-1 1048. FileServer-VM-1 is also a leader for FS2-Pool-2 1050, and is a backup (e.g., is prepared to become a leader upon request, such as in response to a failure of another FSVM) for FS1-Pool-3 1052 and FS2-Pool-4 1054 on Host-2 1006. In particular embodiments, FileServer-VM-2 (abbreviated FSVM-2) 1022 is a leader for a portion of file server instance FS1 and a portion of FS2, and is a backup for another portion of FS1 and another portion of FS2. The portion of FS1 for which FSVM-2 1022 is a leader corresponds to a storage pool labeled FS1-Pool-3 1052. FSVM-2 1022 is also a leader for FS2-Pool-4 1054, and is a backup for FS1-Pool-1 1048 and FS2-Pool-2 1050 on Host-1 1004.

In particular embodiments, the file server instances FS1, FS2 provided by the FSVMs 1020 and 1022 may be accessed by user VMs 1008, 1010, 1012 and 1014 via a network file system protocol such as SMB, CIFS, NFS, or the like. Each FSVM 1020 and 1022 may provide what appears to client applications on user VMs 1008, 1010, 1012 and 1014 to be a single file system instance, e.g., a single namespace of shares, files and folders, for each file server instance. However, the shares, files, and folders in a file server instance such as FS1 may actually be distributed across multiple FSVMs 1020 and 1022. For example, different folders in the same file server instance may be associated with different corresponding FSVMs 1020 and 1022 and CVMs 1024 and 1026 on different host machines 1004 and 1006.

The example file server instance FS1 904 shown in FIG. 9 has two shares, Share-1 908 and Share-2 910. Share-1 908 may be located on FSVM-1 1020, CVM-1 1024, and local storage 1028. Network file system protocol requests from user VMs to read or write data on file server instance FS1 904 and any share, folder, or file in the instance may be sent to FSVM-1 1020. FSVM-1 1020 (or another component, such as a hypervisor in some examples) may determine whether the requested data, e.g., the share, folder, file, or a portion thereof, referenced in the request, is located on FSVM-1, and FSVM-1 is a leader for the requested data. If not, FSVM-1 may respond to the requesting User-VM with an indication that the requested data is not covered by (e.g., is not located on or served by) FSVM-1. Otherwise, the requested data is covered by (e.g., is located on or served by) FSVM-1, so FSVM-1 may send iSCSI protocol requests to a CVM that is associated with the requested data. Note that the CVM associated with the requested data may be the CVM-1 1024 on the same host machine 702 as the FSVM-1, or a different CVM on a different host machine 1006, depending on the configuration of the VFS. In this example, the requested Share-1 is located on FSVM-1, so FSVM-1 processes the request. To provide for path availability, multipath I/O (MPIO) may be used for communication with the FSVM, e.g., for communication between FSVM-1 and CVM-1. The active path may be set to the CVM that is local to the FSVM (e.g., on the same host machine) by default. The active path may be set to a remote CVM instead of the local CVM, e.g., when a failover occurs.

Continuing with the data request example, the associated CVM is CVM 1024, which may in turn access the storage device associated with the requested data as specified in the request, e.g., to write specified data to the storage device or read requested data from a specified location on the storage device. In this example, the associated storage device is in local storage 1028, and may be an HDD or SSD. CVM-1 1024 may access the HDD or SSD via an appropriate protocol, e.g., iSCSI, SCSI, SATA, or the like. CVM 110*a* may send the results of accessing local storage 1028, e.g., data that has been read, or the status of a data write operation, to CVM 1024 via, e.g., SATA, which may in turn send the results to FSVM-1 1020 via, e.g., iSCSI. FSVM-1 1020 may then send the results to user VM via SMB through the Hypervisor 1016.

Share-2 910 may be located on FSVM-2 1022, on Host-2. Network file service protocol requests from user VMs to read or write data on Share-2 may be directed to FSVM-2 1022 on Host-2 by other FSVMs. Alternatively, user VMs may send such requests directly to FSVM-2 1022 on Host-2, which may process the requests using CVM-2 1026 and local storage 1030 on Host-2 as described above for FSVM-1 1020 on Host-1.

A file server instance such as FS1 904 in FIG. 9 may appear as a single file system instance (e.g., a single namespace of folders and files that are accessible by their names or pathnames without regard for their physical locations), even though portions of the file system are stored on different host machines. Since each FSVM may provide a portion of a file server instance, each FSVM may have one or more "local" file systems that provide the portion of the file server instance (e.g., the portion of the namespace of files and folders) associated with the FSVM.

Figure 11:
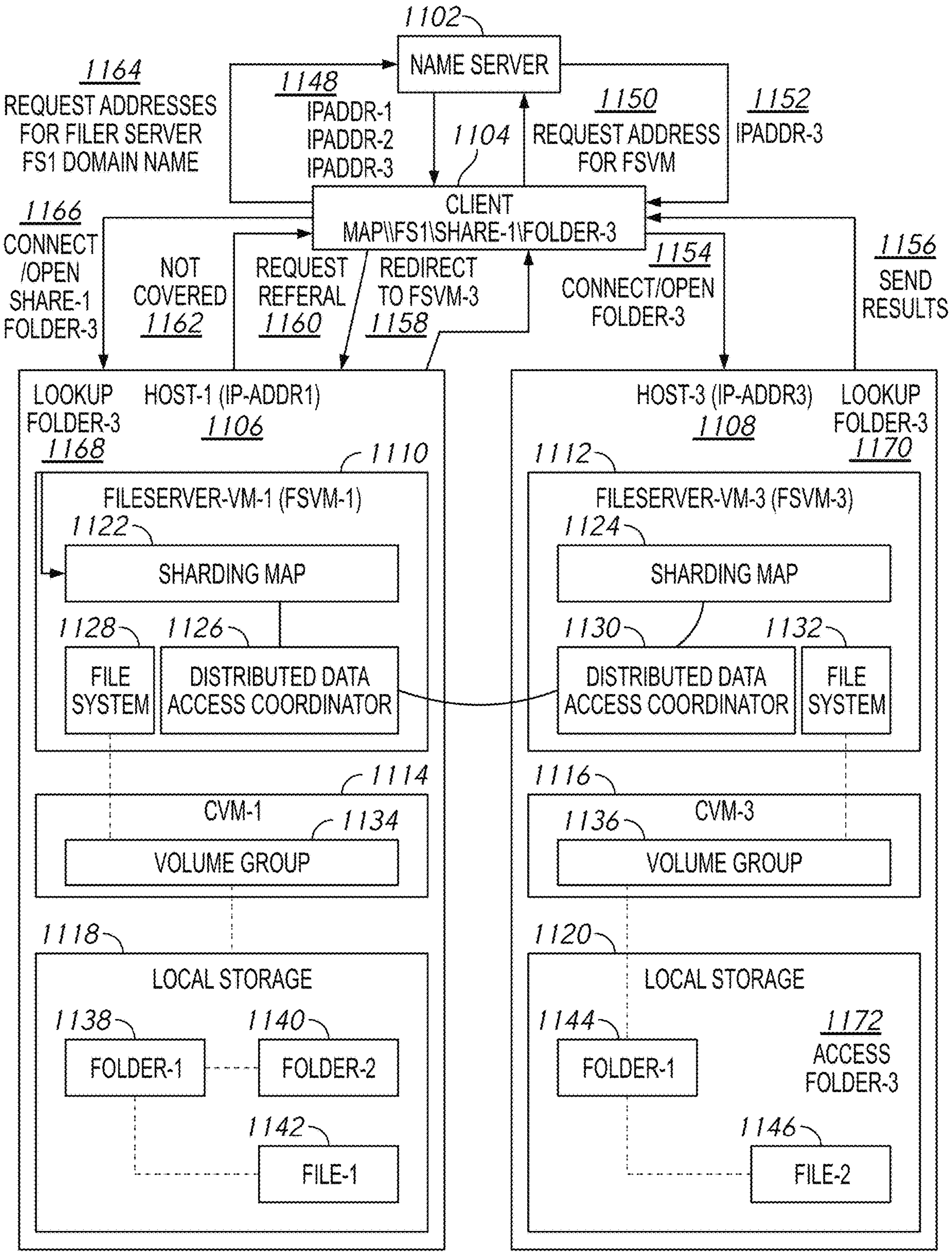
FIG. 11 illustrates example interactions between a client and host machines on which different portions of a VFS instance are stored according to particular embodiments.

FIG. 11 illustrates example interactions between a client 1104 and host machines 1106 and 1108 on which different portions of a VFS instance are stored according to particular embodiments. A client 1104, e.g., an application program executing in one of the user VMs and on the host machines of a virtualized file server described herein requests access to a folder \\FS1.domain.name\Share-1\Folder-3. The request may be in response to an attempt to map \FS1.domain.name\Share-1 to a network drive in the operating system executing in the user VM followed by an attempt to access the contents of Share-1 or to access the contents of Folder-3, such as listing the files in Folder-3.

FIG. 11 shows interactions that occur between the client 1104, FSVMs 1110 and 1112 on host machines 1106 and 1108, and a name server 1102 when a storage item is mapped or otherwise accessed. The name server 1102 may be provided by a server computer system, such as one or more of the host machines 1106, 1108 or a server computer system separate from the host machines 1106, 1108. In one example, the name server 1102 may be provided by an ACTIVE DIRECTORY service executing on one or more computer systems and accessible via the network. The interactions are shown as arrows that represent communications, e.g., messages sent via the network. Note that the client 1104 may be executing in a user VM, which may be co-located with one of the FSVMs 1110 and 1112. In such a co-located case, the arrows between the client 1104 and the host machine on which the FSVM is located may represent communication within the host machine, and such intra-host machine communication may be performed using a mechanism different from communication over the network, e.g., shared memory or inter process communication.

In particular embodiments, when the client 1104 requests access to Folder-3, a VFS client component executing in the user VM may use a distributed file system protocol such as MICROSOFT DFS, or the like, to send the storage access request to one or more of the FSVMs of FIGS. 3-4. To access the requested file or folder, the client determines the location of the requested file or folder, e.g., the identity and/or network address of the FSVM on which the file or folder is located. The client may query a domain cache of FSVM network addresses that the client has previously identified (e.g., looked up). If the domain cache contains the network address of an FSVM associated with the requested folder name \\FS1.domain.name\Share-1\Folder-3, then the client retrieves the associated network address from the domain cache and sends the access request to the network address, starting at step 1164 as described below.

In particular embodiments, at step 1164, the client may send a request for a list of addresses of FSVMs to a name server 1102. The name server 1102 may be, e.g., a DNS server or other type of server, such as a MICROSOFT domain controller (not shown), that has a database of FSVM addresses. At step 1148, the name server 1102 may send a reply that contains a list of FSVM network addresses, e.g., ip-addr1, ip-addr2, and ip-addr3, which correspond to the FSVMs in this example. At step 1166, the client 1104 may send an access request to one of the network addresses, e.g., the first network address in the list (ip-addr1 in this example), requesting the contents of Folder-3 of Share-1. By selecting the first network address in the list, the particular FSVM to which the access request is sent may be varied, e.g., in a round-robin manner by enabling round-robin DNS (or the like) on the name server 1102. The access request may be, e.g., an SMB connect request, an NFS open request, and/or appropriate request(s) to traverse the hierarchy of Share-1 to reach the desired folder or file, e.g., Folder-3 in this example.

At step 1168, FileServer-VM-1 1110 may process the request received at step 1166 by searching a mapping or lookup table, such as a sharding map 1122, for the desired folder or file. The map 1122 maps stored objects, such as shares, folders, or files, to their corresponding locations, e.g., the names or addresses of FSVMs. The map 1122 may have the same contents on each host machine, with the contents on different host machines being synchronized using a distributed data store as described below. For example, the map 1122 may contain entries that map Share-1 and Folder-1 to the File Server FSVM-1 1110, and Folder-3 to the File Server FSVM-3 1112. An example map is shown in Table 1 below. While the example of FIG. 11 is depicted and described with respect to the FSVM processing the request, in some examples, one or more other components of a virtualized system may additionally or instead process the request (e.g., a CVM and/or a hypervisor).

| Stored Object | Location |
| --- | --- |
| Folder-1 | FSVM-1 |
| Folder-2 | FSVM-1 |
| File-1 | FSVM-1 |
| Folder-3 | FSVM-3 |
| File-2 | FSVM-3 |

In particular embodiments, the map 1122 or 1124 may be accessible on each of the host machines. The maps may be copies of a distributed data structure that are maintained and accessed at each FSVM using a distributed data access coordinator 1126 and 1130. The distributed data access coordinator 1126 and 1130 may be implemented based on distributed locks or other storage item access operations. Alternatively, the distributed data access coordinator 1126 and 1130 may be implemented by maintaining a master copy of the maps 1122 and 1124 at a leader node such as the host machine 1108, and using distributed locks to access the master copy from each FSVM 1110 and 1112. The distributed data access coordinator 1126 and 1130 may be implemented using distributed locking, leader election, or related features provided by a centralized coordination service for maintaining configuration information, naming, providing distributed synchronization, and/or providing group services (e.g., APACHE ZOOKEEPER or other distributed coordination software). Since the map 1122 indicates that Folder-3 is located at FSVM-3 1112 on Host-3 1108, the lookup operation at step 1168 determines that Folder-3 is not located at FSVM-1 on Host-1 1106. Thus, at step 1162 the FSVM-1 1110 (or other component of the virtualized system) sends a response, e.g., a "Not Covered" DFS response, to the client 1104 indicating that the requested folder is not located at FSVM-1. At step 1160, the client 1104 sends a request to FSVM-1 for a referral to the FSVM on which Folder-3 is located. FSVM-1 uses the map 1122 to determine that Folder-3 is located at FSVM-3 on Host-3 1108, and at step 1158 returns a response, e.g., a "Redirect" DFS response, redirecting the client 1104 to FSVM-3. The client 1104 may then determine the network address for FSVM-3, which is ip-addr3 (e.g., a host name "ip-addr3.domain.name" or an IP address, 10.1.1.3). The client 1104 may determine the network address for FSVM-3 by searching a cache stored in memory of the client 1104, which may contain a mapping from FSVM-3 to ip-addr3 cached in a previous operation. If the cache does not contain a network address for FSVM-3, then at step 1150 the client 1104 may send a request to the name server 1102 to resolve the name FSVM-3. The name server may respond with the resolved address, ip-addr3, at step 1152. The client 1104 may then store the association between FSVM-3 and ip-addr3 in the client's cache.

In particular embodiments, failure of FSVMs may be detected using the centralized coordination service. For example, using the centralized coordination service, each FSVM may create a lock on the host machine on which the FSVM is located using ephemeral nodes of the centralized coordination service (which are different from host machines but may correspond to host machines). Other FSVMs may volunteer for leadership of resources of remote FSVMs on other host machines, e.g., by requesting a lock on the other host machines. The locks requested by the other nodes are not granted unless communication to the leader host machine is lost, in which case the centralized coordination service deletes the ephemeral node and grants the lock to one of the volunteer host machines and, which becomes the new leader. For example, the volunteer host machines may be ordered by the time at which the centralized coordination service received their requests, and the lock may be granted to the first host machine on the ordered list. The first host machine on the list may thus be selected as the new leader. The FSVM on the new leader has ownership of the resources that were associated with the failed leader FSVM until the failed leader FSVM is restored, at which point the restored FSVM may reclaim the local resources of the host machine on which it is located.

At step 1154, the client 1104 may send an access request to FSVM-3 1112 at ip-addr3 on Host-3 1108 requesting the contents of Folder-3 of Share-1. At step 1170, FSVM-3 1112 queries FSVM-3's copy of the map 1124 using FSVM-3's instance of the distributed data access coordinator 1130. The map 1124 indicates that Folder-3 is located on FSVM-3, so at step 1172 FSVM-3 accesses the file system 1132 to retrieve information about Folder-3 1144 and its contents (e.g., a list of files in the folder, which includes File-2 1146) that are stored on the local storage 1120. FSVM-3 may access local storage 1120 via CVM-3 1116, which provides access to local storage 1120 via a volume group 1136 that contains one or more volumes stored on one or more storage devices in local storage 1120. At step 1156, FSVM-3 may then send the information about Folder-3 and its contents to the client 1104. Optionally, FSVM-3 may retrieve the contents of File-2 and send them to the client 1104, or the client 1104 may send a subsequent request to retrieve File-2 as needed.

Figure 12:
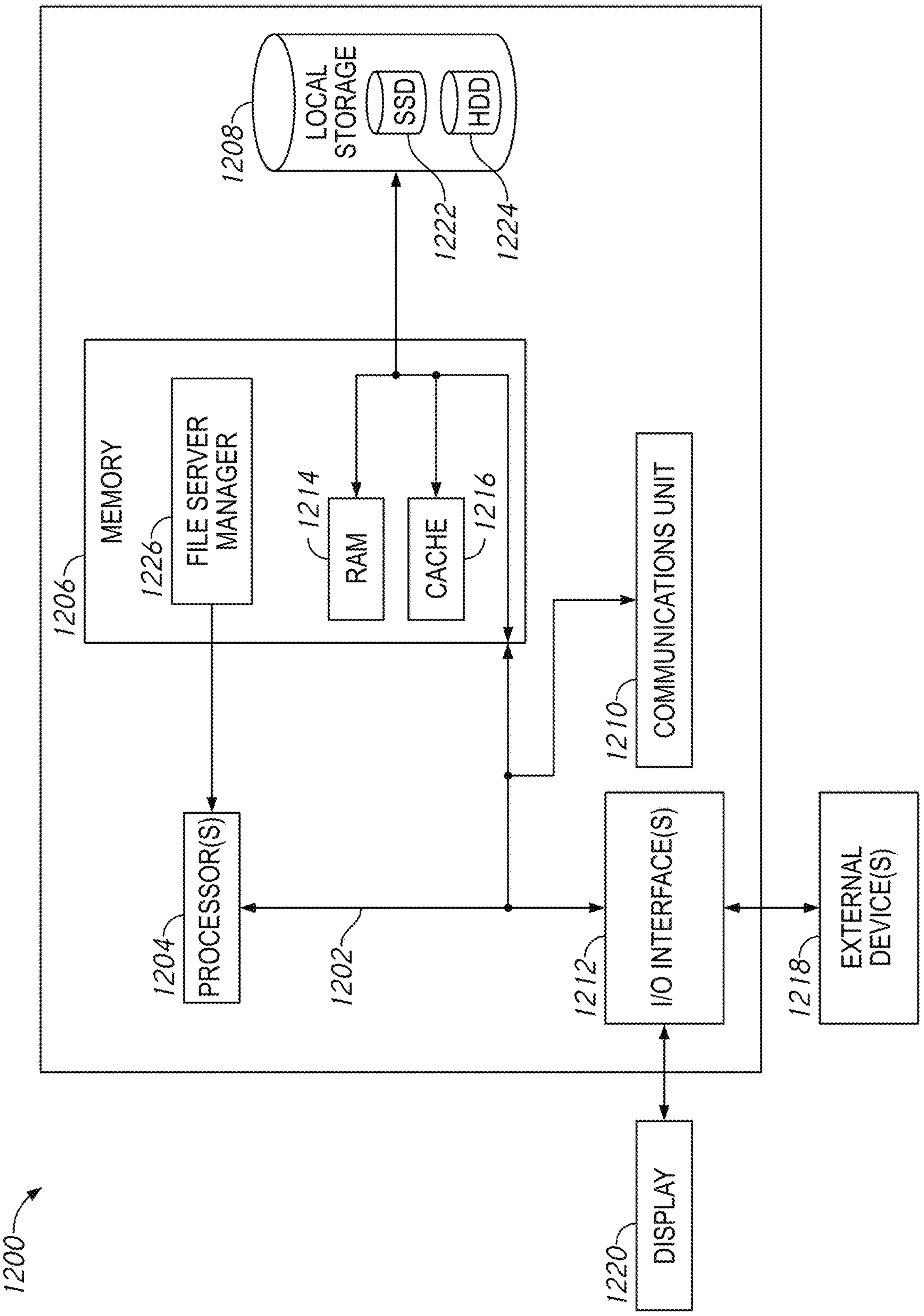
FIG. 12 is a schematic illustration of a computing system arranged in accordance with examples described herein.

FIG. 12 depicts a block diagram of components of a computing system in accordance with examples described herein. It should be appreciated that FIG. 12 provides only an illustration of one implementation and does not imply any limitations with regard to the environments in which different embodiments may be implemented. Many modifications to the depicted environment may be made. The computing system may be used to implement and/or may be implemented by the file server manager 102 of FIG. 1, admin system 302 of FIG. 3, admin system 508 of FIG. 5, and/or admin system 602 of FIG. 6, for example. The components shown in FIG. 12 are exemplary only, and it is to be understood that additional, fewer, and/or different components may be used in other examples.

The computing node 1200 includes one or more communications fabric(s) 1202, which provide communications between one or more processor(s) 1204, memory 1206, local storage 1208, communications unit 1210, and/or I/O interface(s) 1212. The communications fabric(s) 1202 can be implemented with any architecture designed for passing data and/or control information between processors (such as microprocessors, communications and network processors, etc.), system memory, peripheral devices, and any other hardware components within a system. For example, the communications fabric(s) 1202 can be implemented with one or more buses.

The memory 1206 and the local storage 1208 may be computer-readable storage media. In the example of FIG. 12, the memory 1206 includes random access memory RAM 1214 and cache 1216. In general, the memory 1206 can include any suitable volatile or non-volatile computer-readable storage media. In this embodiment, the local storage 1208 includes an SSD 1222 and an HDD 1224. The memory 1206 may include executable instructions for providing a file server manager 1226. The instructions for providing a file server manager 1226 may be used to implement and/or implemented by file server manager 102 of FIG. 1, file server manager 304 of FIG. 3, file server manager 406 of FIG. 4, file server manager 510 of FIG. 5, and/or file server manager 604 of FIG. 6.

Various computer instructions, programs, files, images, etc. may be stored in local storage 1208 and/or memory 1206 for execution by one or more of the respective processor(s) 1204 via one or more memories of memory 1206. In some examples, local storage 1208 includes a magnetic HDD 1224. Alternatively, or in addition to a magnetic hard disk drive, local storage 1208 can include the SSD 1222, a semiconductor storage device, a read-only memory (ROM), an erasable programmable read-only memory (EPROM), a flash memory, or any other computer-readable storage media that is capable of storing program instructions or digital information.

The media used by local storage 1208 may also be removable. For example, a removable hard drive may be used for local storage 1208. Other examples include optical and magnetic disks, thumb drives, and smart cards that are inserted into a drive for transfer onto another computer-readable storage medium that is also part of local storage 1208.

Communications unit 1210, in some examples, provides for communications with other data processing systems or devices. For example, communications unit 1210 may include one or more network interface cards. Communications unit 310 may provide communications through the use of either or both physical and wireless communications links.

I/O interface(s) 1212 may allow for input and output of data with other devices that may be connected to computing node 1200. For example, I/O interface(s) 1212 may provide a connection to external device(s) 1218 such as a keyboard, a keypad, a touch screen, and/or some other suitable input device. External device(s) 318 can also include portable computer-readable storage media such as, for example, thumb drives, portable optical or magnetic disks, and memory cards. Software and data used to practice embodiments of the present invention can be stored on such portable computer-readable storage media and can be loaded onto and/or encoded in memory 1206 and/or local storage 1208 via I/O interface(s) 1212 in some examples. I/O interface(s) 1212 may connect to a display 1220. Display 1220 may provide a mechanism to display data to a user and may be, for example, a computer monitor.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A file server manager comprising:

at least one processor;

non-transitory computer readable media encoded with instructions which, when executed by the at least one processor, configure the file server manager to perform actions comprising;

registering, at the file server manager, a virtualized file server, the registering comprising storing registration information identifying a virtualization environment for the virtualized file server;

receiving, at an application programming interface (API) gateway managed by the file server manager, a request to perform an operation corresponding to the virtualized file server in communication with the file server manager;

authenticating the request via an authentication process using the API gateway managed by the file server manager;

accessing, based on the authenticating, the virtualized file server using the API gateway managed by the file server manager;

formatting the request to be specific to the virtualization environment of the virtualized file server using the registration information identifying the virtualization environment for the virtualized file server; and routing, using the API gateway managed by the file server manager, the formatted request to the virtualized file server, wherein the virtualized file server is configured to process and service the request upon receipt of the request.

2. The file server manager of claim 1, wherein the request is a management request, wherein the request includes an API call, and wherein the request is to perform the operation for the virtualized file server.

3. The file server manager of claim 1, wherein the authentication process comprises an identify access management (IAM) process, a role-based access (RBAC) process, or a combination thereof.

4. The file server manager of claim 1, wherein the instructions, when executed by at least one processor of the file server manager, configure the file server manager to perform actions further comprising providing, at the API gateway managed by the file server manager, a single-sign on to a file server, including the virtualized file server of one or more virtualized file servers.

5. The file server manager of claim 4, wherein credentials used to authenticate the request via the authentication process are also used to sign on to the virtualized file server via the single-sign on.

6. The file server manager of claim 1, wherein the file server manager is configured to manage the virtualized file server, and wherein the instructions, when executed by at least one processor of the file server manager, configure the file server manager to perform actions further comprising validating the request based at least on receiving one or more authentication tokens from the virtualized file server.

7. The file server manager of claim 1, wherein the virtualized file server includes one or more file server virtual machines (FSVMs) used to implement the virtualized file server.

8. The file server manager of claim 7, wherein the one or more FSVMs are hosted on a cloud computing system.

9. The file server manager of claim 7, wherein the file server manager is hosted on a cloud computing system separate from the virtualization environment hosting the virtualized file server including the one or more FSVMs.

10. The file server manager of claim 1, wherein the instructions, when executed by at least one processor of the file server manager, configure the file server manager to perform actions further comprising routing, via the API gateway, the formatted request to a second API gateway of the virtualized file server.

11. The file server manager of claim 1, wherein the request is received without information identifying the virtualization environment in which the virtualized file server is hosted.

12. At least one non-transitory computer readable media encoded with instructions which, when executed, configure a system to perform actions comprising:

registering, at a file server manager, a virtualized file server, the registering comprising storing registration information identifying a virtualization environment for the virtualized file server;

receiving, at an application programming interface (API) gateway managed by the file server manager, a request to perform an operation corresponding to the virtualized file server in communication with the file server manager;

authenticating the request via an authentication process using the API gateway managed by the file server manager;

accessing, based on the authenticating, the virtualized file server using the API gateway managed by the file server manager;

formatting the request to be specific to the virtualization environment of the virtualized file server using the registration information identifying the virtualization environment for the virtualized file server; and routing, using the API gateway managed by the file server manager, the formatted request to the virtualized file server, wherein the virtualized file server is configured to process and service the request upon receipt of the request.

13. The at least one non-transitory computer readable media of claim 12, wherein the request is a management request, wherein the request includes an API call, and wherein the request is to perform the operation for the virtualized file server.

14. The at least one non-transitory computer readable media of claim 12, wherein the authentication process comprises an identify access management (IAM) process, a role-based access (RBAC) process, or a combination thereof.

15. The at least one non-transitory computer readable media of claim 12, wherein the instructions further configure the system to perform actions comprising providing, at the API gateway managed by the file server manager, a single-sign on to a file server, including the virtualized file server of one or more virtualized file servers.

16. The at least one non-transitory computer readable media of claim 15, wherein credentials used to authenticate the request via the authentication process are also used to sign on to the virtualized file server via the single-sign on.

17. The at least one non-transitory computer readable media of claim 12, wherein the file server manager is configured to manage the virtualized file server, and wherein the instructions further configure the system to perform actions comprising validating the request based at least on receiving one or more authentication tokens from the virtualized file server.

18. The at least one non-transitory computer readable media of claim 12, wherein the virtualized file server includes one or more (FSVMs) used to implement the virtualized file server.

19. The at least one non-transitory computer readable media of claim 12, wherein the instructions further configure the system to perform actions comprising routing, via the API gateway, the formatted request to a second API gateway of the virtualized file server.

20. The at least one non-transitory computer readable media of claim 12, wherein the one or more FSVMs are hosted on a cloud computing system.

21. The at least one non-transitory computer readable media of claim 12, wherein the file server manager is hosted on a cloud computing system separate from the virtualization environment hosting the virtualized file server including the one or more FSVMs.

22. The at least one non-transitory computer readable media of claim 12, wherein the request is received without information identifying the virtualization environment in which the virtualized file server is hosted.

23. A method comprising:

registering, at a file server manager, a virtualized file server, the registering comprising storing registration information identifying a virtualization environment for the virtualized file server;

receiving, at an application programming interface (API) gateway managed by the file server manager, a request to perform an operation corresponding to the virtualized file server in communication with the file server manager;

authenticating the request via an authentication process using the API gateway managed by the file server manager;

accessing, based on the authenticating, the virtualized file server using the API gateway managed by the file server manager;

formatting the request to be specific to the virtualization environment of the virtualized file server using the registration information identifying the virtualization environment for the virtualized file server; and routing, using the API gateway managed by the file server manager, the formatted request to the virtualized file server, wherein the virtualized file server is configured to process and service the request upon receipt of the request.

24. The method of claim 23, wherein the request is a management request, wherein the request includes an API call, and wherein the request is to perform the operation for the virtualized file server.

25. The method of claim 23, wherein the authentication process comprises an identify access management (IAM) process, a role-based access (RBAC) process, or a combination thereof.

26. The method of claim 23, wherein the method further comprises providing, at the API gateway managed by the file server manager, a single-sign on to a file server, including the virtualized file server of one or more virtualized file servers.

27. The method of claim 26, wherein credentials used to authenticate the request via the authentication process are also used to sign on to the virtualized file server via the single-sign on.

28. The method of claim 23, wherein the file server manager is configured to manage the virtualized file server, and wherein the method further comprises validating the request based at least on receiving one or more authentication tokens from the virtualized file server.

29. The method of claim 23, wherein the virtualized file server includes one or more file server virtual machines (FSVMs) used to implement the virtualized file server.

30. The method of claim 23, further comprising routing, via the API gateway, the formatted request to a second API gateway of the virtualized file server.

31. The method of claim 23, wherein the one or more FSVMs are hosted on a cloud computing system.

32. The method of claim 23, wherein the file server manager is hosted on a cloud computing system separate from the virtualization environment hosting the virtualized file server including the one or more FSVMs.

33. The method of claim 23, wherein the request is received without information identifying the virtualization environment in which the virtualized file server is hosted.

* * * * *